US012261949B2

United States Patent
Medard et al.

(10) Patent No.: US 12,261,949 B2
(45) Date of Patent: Mar. 25, 2025

(54) NETWORK CODING-BASED POST-QUANTUM CRYPTOGRAPHY

(71) Applicant: Massachusetts Institute of Technology, Cambridge, MA (US)

(72) Inventors: Muriel Medard, Belmont, MA (US); Alejandro Cohen, Brookline, MA (US); Rafael Gregorio Lucas D'Oliveira, Somerville, MA (US); Salman Salamatian, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/460,991

(22) Filed: Aug. 30, 2021

(65) Prior Publication Data

US 2022/0069987 A1     Mar. 3, 2022

Related U.S. Application Data

(60) Provisional application No. 63/072,430, filed on Aug. 31, 2020.

(51) Int. Cl.
*H04L 29/06*     (2006.01)
*H04L 9/08*     (2006.01)
(Continued)

(52) U.S. Cl.
CPC .......... *H04L 9/0858* (2013.01); *H04L 9/0825* (2013.01); *H04L 9/302* (2013.01); *H04L 9/3215* (2013.01); *H04L 2209/34* (2013.01)

(58) Field of Classification Search
CPC . H04L 63/0428; H04L 9/0825; H04L 9/0858; H04L 2209/12; H04L 2209/34; H04L 9/302
See application file for complete search history.

(56) References Cited

U.S. PATENT DOCUMENTS 5,577,056 A    11/1996   Malik et al.
6,128,773 A    10/2000   Snider
(Continued)

FOREIGN PATENT DOCUMENTS

EP          1 638 239 A1    3/2006
WO    WO 2007/109216 A1    9/2007
(Continued)

OTHER PUBLICATIONS

Agrawal et al.; "A Comparative Survey on Symmetric Key Encryption Techniques"; International Journal on Computer Science and Engineering (IJSCE); vol. 4 No. 5; May 2012; 6 Pages.
(Continued)

*Primary Examiner* — Dao Q Ho
(74) *Attorney, Agent, or Firm* — DALY, CROWLEY, MOFFORD & DURKEE, LLP

(57) ABSTRACT

A system and method provide a hybrid communication scheme that achieves high communication rates with post-quantum computational security guarantees. Messages to be securely communicated are first mixed using an individually secure encoding, such as a linear network code, and some of the encoded messages are further encrypted. The encrypted and unencrypted messages are sent via different communications channels. Each unencrypted message becomes almost as secure as the encrypted messages because of the pre-mixing, since decoding any one of the messages requires all of the messages, including the encrypted messages. Thus, a very few encrypted messages may be used, allowing the rate of communication to approach one as the number of channels increases. This is particularly beneficial when a classical public-key cryptosystem can only be used in part of the data transmitted or stored, in the presence of noisy channels, in distributed data storage, and other applications.

13 Claims, 14 Drawing Sheets

(51) Int. Cl.
  *H04L 9/30* (2006.01)
  *H04L 9/32* (2006.01)

(56) References Cited

U.S. PATENT DOCUMENTS

| | | |
|---|---|---|
| 6,621,851 B1 | 9/2003 | Agee et al. |
| 6,885,653 B2 | 4/2005 | Choi et al. |
| 7,064,489 B2 | 6/2006 | Price |
| 7,071,853 B2 | 7/2006 | Price |
| 7,095,343 B2 | 8/2006 | Xie et al. |
| 7,164,691 B2 | 1/2007 | Knapp et al. |
| 7,283,564 B2 | 10/2007 | Knapp et al. |
| 7,349,440 B1 | 3/2008 | Chou et al. |
| 7,408,938 B1 | 8/2008 | Chou et al. |
| 7,414,978 B2 | 8/2008 | Lun et al. |
| 7,529,198 B2 | 5/2009 | Jain et al. |
| 7,706,365 B2 | 4/2010 | Effros et al. |
| 7,760,728 B2 | 7/2010 | Chou et al. |
| 7,821,980 B2 | 10/2010 | Chakrabarti et al. |
| 7,876,677 B2 | 1/2011 | Cheshire |
| 7,912,003 B2 | 3/2011 | Radunovic et al. |
| 7,945,842 B2 | 5/2011 | He |
| 8,040,836 B2 | 10/2011 | Wu et al. |
| 8,068,426 B2 | 11/2011 | Sundararajan et al. |
| 8,130,776 B1 | 3/2012 | Sundararajan et al. |
| 8,279,781 B2 | 10/2012 | Lucani et al. |
| 8,451,756 B2 | 5/2013 | Lucani et al. |
| 8,482,441 B2 | 7/2013 | Medard et al. |
| 8,504,504 B2 | 8/2013 | Liu |
| 8,571,214 B2 | 10/2013 | Lima et al. |
| 2002/0141590 A1 | 10/2002 | Montgomery |
| 2003/0055614 A1 | 3/2003 | Pelikan |
| 2003/0159140 A1 | 8/2003 | Candelore |
| 2003/0214951 A1 | 11/2003 | Joshi et al. |
| 2004/0123094 A1 | 6/2004 | Sprunk |
| 2004/0203752 A1 | 10/2004 | Wojaczynski et al. |
| 2005/0010675 A1 | 1/2005 | Jaggi et al. |
| 2005/0041751 A1* | 2/2005 | Nir .................. H04L 1/0071 375/267 |
| 2005/0047516 A1* | 3/2005 | Grolmusz .................. H04L 1/06 375/267 |
| 2005/0078653 A1 | 4/2005 | Agashe et al. |
| 2005/0152391 A1 | 7/2005 | Effros et al. |
| 2005/0204260 A1 | 9/2005 | Ebert et al. |
| 2005/0251721 A1 | 11/2005 | Ramesh et al. |
| 2006/0015791 A1* | 1/2006 | Kikuchi ............ H03M 13/2936 |
| 2006/0020560 A1 | 1/2006 | Rodriguez et al. |
| 2006/0088157 A1* | 4/2006 | Fujii .................. H04L 9/0858 380/30 |
| 2006/0146791 A1 | 7/2006 | Deb et al. |
| 2006/0224760 A1 | 10/2006 | Yu et al. |
| 2006/0247952 A1 | 11/2006 | Muraca |
| 2007/0046686 A1 | 3/2007 | Keller |
| 2007/0116027 A1 | 5/2007 | Ciavaglia et al. |
| 2007/0274324 A1 | 11/2007 | Wu et al. |
| 2008/0043676 A1 | 2/2008 | Mousseau et al. |
| 2008/0049746 A1 | 2/2008 | Morrill et al. |
| 2008/0123579 A1 | 5/2008 | Kozat et al. |
| 2008/0259796 A1 | 10/2008 | Abousleman et al. |
| 2008/0291834 A1 | 11/2008 | Chou et al. |
| 2008/0320104 A1* | 12/2008 | Turner ................ H04L 67/1076 709/219 |
| 2008/0320363 A1 | 12/2008 | He |
| 2009/0003216 A1 | 1/2009 | Radunovic et al. |
| 2009/0086977 A1 | 4/2009 | Berggren |
| 2009/0135717 A1 | 5/2009 | Kamal et al. |
| 2009/0153576 A1 | 6/2009 | Keller |
| 2009/0175320 A1 | 7/2009 | Haustein et al. |
| 2009/0198829 A1 | 8/2009 | Sengupta et al. |
| 2009/0207930 A1 | 8/2009 | Sirkeci et al. |
| 2009/0238097 A1 | 9/2009 | Le Bars et al. |
| 2009/0248898 A1 | 10/2009 | Gkantsidis et al. |
| 2009/0285148 A1 | 11/2009 | Luo et al. |
| 2009/0310582 A1 | 12/2009 | Beser |
| 2009/0313459 A1 | 12/2009 | Horvath |
| 2009/0316763 A1 | 12/2009 | Erkip et al. |
| 2010/0014669 A1 | 1/2010 | Jiang |
| 2010/0046371 A1 | 2/2010 | Sundararajan et al. |
| 2010/0057636 A1 | 3/2010 | Brennan et al. |
| 2010/0111165 A1 | 5/2010 | Kim et al. |
| 2010/0146357 A1 | 6/2010 | Larsson |
| 2010/0295710 A1 | 11/2010 | Xu et al. |
| 2011/0087946 A1* | 4/2011 | Planjery ............... H03M 13/114 714/752 |
| 2011/0238855 A1 | 9/2011 | Korsunsky et al. |
| 2011/0243470 A1 | 10/2011 | Noguchi |
| 2012/0218891 A1 | 8/2012 | Sundararajan et al. |
| 2012/0300692 A1 | 11/2012 | Sfar et al. |
| 2013/0107764 A1 | 5/2013 | Zeger et al. |
| 2013/0114481 A1 | 5/2013 | Kim et al. |
| 2013/0114611 A1 | 5/2013 | Zeger et al. |
| 2013/0195106 A1 | 8/2013 | Calmon et al. |
| 2014/0064296 A1 | 3/2014 | Haeupler et al. |
| 2014/0185803 A1 | 7/2014 | Lima et al. |
| 2014/0268398 A1 | 9/2014 | Medard et al. |
| 2014/0269485 A1 | 9/2014 | Medard et al. |
| 2014/0269503 A1 | 9/2014 | Medard et al. |
| 2014/0269505 A1 | 9/2014 | Medard et al. |
| 2014/0280395 A1 | 9/2014 | Medard et al. |
| 2014/0280454 A1 | 9/2014 | Medard et al. |
| 2016/0154970 A1* | 6/2016 | Calmon .................. H04L 9/065 713/165 |
| 2016/0359581 A1* | 12/2016 | Mohamad ............ H04L 1/0071 |
| 2017/0005789 A1* | 1/2017 | Chan ..................... H04L 9/0656 |
| 2017/0346627 A1* | 11/2017 | Alleaume ............ H04L 9/0858 |
| 2018/0331826 A1* | 11/2018 | Kaliteevskiy ......... H04B 10/70 |
| 2019/0020634 A1* | 1/2019 | Montgomery ....... H04L 63/0442 |
| 2020/0235929 A1* | 7/2020 | Jacobs .................. H04L 9/3073 |
| 2022/0069987 A1* | 3/2022 | Medard ................ H04L 9/0825 |

FOREIGN PATENT DOCUMENTS

| | | |
|---|---|---|
| WO | WO 2010/005181 A2 | 1/2010 |
| WO | WO 2010/025362 A2 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159570 A1 | 10/2014 |
| WO | WO 2014/160194 A3 | 10/2014 |
| WO | WO 2021/115670 A1 | 6/2021 |

OTHER PUBLICATIONS

Andrews et al.; "What Will 5G Be?"; IEEE JSAC Special Issue on 5G Wireless Communication Systems; vol. 32, No. 6; 2014; 17 Pages.

Augot et al.; "Initial recommendations of long-term secure post-quantum systems"; PQCRYPTO EU; Horizon 2020; Submitted 7, 2015; 10 Pages.

Auradkar et al.; "Data Infrastructure at LinkedIn"; 2012 IEEE 28th International Conference on Data Engineering; IEEE Computer Society; IEEE, 2012; 12 Pages.

Baldi et al.; "Cryptanalysis of a new instance of McEliece cryptosystem based on QC-LDPC Codes"; 2007 IEEE International Symposium on Information Theory; IEEE, 2007; 5 Pages.

Baldi; "LDPC codes in the McEliese cryptosystem: attacks and countermeasures"; Enhancing Cryptographic Primitives with Techniques from Error Correcting Codes 23; 2009; 15 Pages.

Bernstein et al.; "Attacking and defending the McEliese cryptosystem"; International Workshop on Post-Quantum Cryptography; 2008; 16 Pages.

Bernstein; "Introduction to post-quantum cryptography"; Post Quantum Cryptography; Springer, 2009; 14 Pages.

Bhattad et al.; "Weakly Secure Network Coding"; NetCod; Apr. 7, 2005; 6 Pages.

Borthakur et al.; "Apache Hadoop Goes Realtime at Facebook"; Proceedings of the 2011 ACM SIGMOD International Conference on Management of Data; 2011; 10 Pages.

(56) References Cited

OTHER PUBLICATIONS

Calder et al.; "Windows Azure Storage: A Highly Available Cloud Storage Service with Strong Consistency"; Proceedings of the 23$^{rd}$ ACM Symposium on Operating Systems Principles; 2011; 15 Pages.

Chang et al.; "Bigtable: A Distributed Storage System for Structured Data"; OSDI '06: 7$^{th}$ USENIX Symposium on Operating Systems Design and Implementation; ACM Transactions on Computer Systems (TOCS); vol. 26, No. 2; 2008; 14 Pages.

Chen et al.; "On Secure Communication over the Multiple Access Channel"; 2016 International Symposium on Information Theory and Its Applications (ISITA); IEEE, 2016; 5 Pages.

Chen et al.; "On the Individual Secrecy Rate Region for the Broadcast Channel with an External Eavesdropper"; 2015 IEEE International Symposium on Information Theory (ISIT); IEEE, 2015; 5 Pages.

Cloud et al.; "A Coded Generalization of Selective Repeat ARQ"; 2015 IEEE Conference on Computer Communications (INFOCOM); IEEE, 2015; 9 Pages.

Cohen et al.; "Adaptive Causal Network Coding with Feedback for Multipath Multi-hop Communications"; IEEE Transactions on Communications; vol. 69, No. 2; Oct. 25, 2020; 20 Pages.

Cohen et al.; "Adaptive Causal Network Coding with Feedback"; IEEE Transactions on Communications; vol. 68, No. 7; Apr. 2020; 16 Pages.

Cohen et al.; "Secure Multi-Source Multicast"; IEEE Transactions on Communications; vol. 67, No. 1; 2018; 16 Pages.

DeCandia et al.; "Dynamo: Amazon's Highly Available Key-value Store"; ACM SIGOPS operating systems review; vol. 41, No. 6; 2007; 16 Pages.

Dey et al.; "Sufficiently Myopic Adversaries Are Blind"; IEEE Transactions on Information Theory; vol. 65, No. 9; Sep. 2019; 19 Pages.

Dey et al.; "The Interplay of Causality and Myopia in Adversarial Channel Models"; 2019 IEEE International Symposium on Information Theory (ISIT); IEEE, 2019; 5 pages.

Dimakis et al.; "A Survey on Network Codes for Distributed Storage"; Proceedings of the IEEE; vol. 99, No. 3; 2011; 13 Pages.

Dimakis et al.; "Network Coding for Distributed Storage Systems"; IEEE transactions on information theory; vol. 56, No. 9; 2010; 12 Pages.

Ding et al.; "Cryptanalysis of HFEv and Internal Perturbation of HFE"; International Workshop on Public Key Cryptography; 2005; 14 Pages.

El Rouayheb et al.; "Secure Network Coding for Wiretap Networks of Type II"; IEEE Transactions on Information Theory; vol. 58, No. 3; 2012; 23 Pages.

El Rouayheb et al.; "On Wiretap Networks II"; 2007 IEEE International Symposium on Information Theory; IEEE, 2007; 5 Pages.

Faugère et al.; "A Distinguisher for High Rate McEliece Cryptosystems"; IEEE Transactions on Information Theory, Institute of Electrical and Electronics Engineers; vol. 59, No. 10; 2013; 23 Pages.

Ghemawat et al.; "The Google File System"; Proceedings on the nineteenth ACM Symposium on Operating systems principles; 2003; 15 Pages.

Goldenbaum et al.; "The Multiple-Access Channel with an External Eavesdropper: Trusted vs. Untrusted Users"; 2015 49$^{th}$ Asilomar Conference on Signals, Systems and Computers; IEEE, 2015; 5 pages.

GS Association; "The 5G era in the US"; Mar. 2018; 39 Pages.

Hallgren et al.; "Fast Quantum Algorithms for Computing the Unit Group and Class Group of a Number Field"; Proceedings of the thirty-seventh annual ACM symposium on Theory of Computing; 2005; 10 Pages.

Hallgren et al.; "Polynomial-Time Quantum Algorithms for Pell's Equation and the Principal Ideal Problem"; Journal of the ACM (JACM); vol. 54, No. 1; 2007; 21 Pages.

He et al.; "Secure Communication with a Byzantine Relay"; 2009 IEEE International Symposium on Information Theory; IEEE, 2009; 5 Pages.

Ho et al.; "Byzantine Modification Detection in Multicast Networks With Random Network Coding"; IEEE Transactions On Information Theory; vol. 54, No. 6; Jun. 2008; 6 Pages.

Kadhe et al.; "On a Weakly Secure Regenerating Code Construction for Minimum Storage Regime"; Fifty Second Annual Allerton Conference on Communication, Control, and Computing (Allerton); IEEE, Oct. 2014; 8 Pages.

Kadhe et al.; "Weakly Secure Regenerating Codes for Distributed Storage"; 2014 International Symposium on Network Coding (NetCod); IEEE, 2014; 15 Pages.

Karzand et al.; "Low Delay Random Linear Coding Over a Stream"; Fifty-Second Annual Allerton Conference; IEEE, 2014; 8 Pages.

Kobayashi et al.; "Secure multiplex coding to attain the channel capacity in wiretap channels"; arXiv preprint cs/0509047v1[cs.IT]; Sep. 16, 2005; 15 Pages.

Landais et al.; "An efficient attack of a McEliece cryptosystem variant based on convolutional codes"; International Workshop on Post-Quantum Cryptography; 2013; 12 Pages.

Liu et al.; "Security against passive attacks on network coding system—A survey"; Computer Networks 138 (2018); Elsevier B.V; Available online Mar. 19, 2018; 20 Pages.

Löndahl et al.; "A New Version of McEliece PKC Based on Convolutional Codes"; International Conference on Information and Communications Security; 2012; 10 Pages.

Malak et al.; "Delay-Aware Coding in Multi-Hop Line Networks"; 2019 IEEE 5$^{th}$ World Forum on Internet of Things (WF-IoT); IEEE, 2019; 6 Pages.

Malak et al.; "How to Distribute Computation in Networks"; IEEE INFOCOM 2020—IEEE Conference on Computer Communications; IEEE, 2020; 10 Pages.

Mansour et al.; "On the Individual Secrecy Capacity Regions of the General, Degraded, and Gaussian Multi-Receiver Wiretap Broadcast Channel"; IEEE Transactions on Information Forensics and Security; vol. 11, No. 9; Sep. 2016; 16 Pages.

Mansour et al.; "Secrecy Measures for Broadcast Channels with Receiver Side Information: Joint vs Individual" 2014 IEEE Information Theory Workshop (ITW 2014); IEEE, 2014; 5 Pages.

Mansour et al.; "The Individual Secrecy Capacity of Degraded Multi-Receiver Wiretap Broadcast Channels"; IEEE, ICC 2015—Communication Theory Symposium; IEEE, 2015; 6 Pages.

Mansour et al.; "The Individual Secrecy Capacity of the Gaussian SISO and Degraded Gaussian MIMO Multi-Receiver Wiretap Channel"; 2015 IEEE 16$^{th}$ International Workshop on Signal Processing Advances in Wireless Communications (SPAWC); IEEE, 2015; 5 Pages.

Matsumoto et al.; "Universal Secure Multiplex Network Coding with Dependent and Non-Uniform Messages"; IEEE Transactions on Information Theory; vol. 63, No. 6; 2017; 10 Pages.

Meyer et al.; "A Man-in-the-Middle Attack on UMTS"; Proceedings of the 3$^{rd}$ ACM Workshop on Wireless Security; 2004; 8 Pages.

Micciancio et al.; "On the Bit Security of Cryptographic Primitives"; Annual International Conference on the Theory and Applications of Cryptographic Techniques; 2018; 26 Pages.

Minder et al.; "Cryptanalysis of the Sidelnikov cryptosystem"; Annual International Conference on the Theory and Applications of Cryptographic Techniques; Advances in Cryptology—Eurocrypt 2007, LNCS; vol. 4515; IACR, 2007; 16 Pages.

Monico et al.; "Using Low Density Parity Check Codes in the McEliece Cryptosystem"; 2000 IEEE International Symposium on Information Theory (Cat. No. 00CH37060); IEEE, 2000; 1 Page.

Paunkoska et al.; "Improving the Secrecy of Distributed Storage Systems using Interference Alignment"; 2018 14$^{th}$ International Wireless Communications & Mobile Computing Conference (IWCMC); IEEE, 2018; 20 Pages.

Rashmi et al.; "Optimal Exact-Regenerating Codes for Distributed Storage at the MSR and MBR Points via a Product-Matrix Construction"; IEEE Transactions on Information Theory; vol. 57, No. 8; 2011; 20 Pages.

Rivest et al.; "A Method for Obtaining Digital Signatures and Public-Key Cryptosystem"; Communications of the ACM; vol. 21, No. 2; Feb. 1978; 7 Pages.

(56) References Cited

OTHER PUBLICATIONS

Saadat et al.; "Multipath multihop mmWave backhaul in ultra-dense small-cell network"; Digital Communications and Networks; vol. 4; Available online Aug. 30, 2018; 7 Pages.
Sarwate; "Coding against myopic adversaries"; 2010 IEEE Information Theory Workshop—ITW 2010; IEEE, 2010; 5 Pages.
Schmidt et al.; "Polynomial Time Quantum Algorithm for the Computation of the Unit Group of a No. Field"; Proceedings of the thirty-seventh annual ACM symposium on Theory of computing; 2005; 6 Pages.
Schneuwly et al.; "Discrete Water Filling Multi-Path Packet Scheduling"; 2020 IEEE International Symposium on Information Theory (ISIT); IEEE, 2020; 6 Pages.
Sendrier; "On the Security of the McEliece Public-Key Cryptosystem"; Information, Coding and Mathematics; Springer, 2002; 23 Pages.
Shor; "Algorithms for Quantum Computation Discrete Logarithms and Factoring"; Proceedings in the $34^{th}$ Annual Symposium on Foundations of Computer Science; IEEE, 1994; 11 Pages.
Shor; "Polynomial-Time Algorithms for Prime Factorization and Discrete Logarithms on a Quantum Computer"; SIAM Review; vol. 41, No. 2; 1999; 28 Pages.
Silva et al.; "Universal Secure Networks Coding via Rank-Metric Codes"; IEEE Transactions on Information Theory; vol. 57, No. 2; 2011; 12 Pages.
Silva et al.; "Universal Weakly Secure Network Coding"; 2009 IEE Information Theory Workshop on Networking and Information Theory; IEEE, 2009; 5 Pages.
SNOB-5G; The First Steps into a Scalable Network Backhauling Solution for 5G; Downloaded Apr. 8, 2022; http://snob-5g.com; 2 Pages.
Wagoner; "Detecting Man-in-the-Middle Attacks against Transport Layer Security Connections with Timing Analysis"; Theses and Dissertations, 1433; 2011; 124 Pages.
Zeng et al.; "Joint Coding and Scheduling Optimization in Wireless Systems with Varying Delay Sensitivities"; 2012 $9^{th}$ Annual IEEE Communications Society Conference on Sensor, Mesh and Ad Hoc Communications and Networks (SECON); IEEE, 2012; 9 Pages.
Zhang et al.; "P-Coding: Secure Network against Eavesdropping Attacks"; 2010 Proceedings IEEE INFOCOM; IEEE, 2010; 9 pages.
Liu, G. et al., "Low-Complexity Secure Network Coding Against Wiretapping Using Intra/Inter-ge neration Coding;" China Communications; Jun. 2015; 18 Pages.
Othman et al., "Enhancing data security in ad hoc networks based on multipath routing;" J. Parallel Distrib, Comput.; Available online on Mar. 28, 2009; 8 Pages.
Pham et al., "Integrating Classical Preprocessing into an Optical Encryption Scheme;" Article from Entropy, vol. 21, No. 9; Published on Sep. 7, 2019; 14 Pages.
PCT International Search Report and Written Opinion dated Dec. 2, 2021 for International Application No. PCT/US2021/048209; 13 Pages.
"Data Service Options for Spread Spectrum Systems: Radio Link Protocol Type 3;" 3GPP2 C.S0017-010-A; Version 2.0; Sep. 2005; 56 Pages.
Abichar, et al.; "WiMax vs. LTE: Who Will Lead the Broadband Mobile Internet?;" Mobile Computing; IEEE Computer Society; IT Pro May/Jun. 2010; 7 Pages.
Abuzeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; 5 Pages.
Acedanski, et al.; "How Good is Random Linear Coding Based Distributed Network Storage?;" Proc. $1^{st}$ Workshop on Network Coding, Theory, and Applications (Netcod'05); Apr. 2005; 6 Pages.
Adamson, et al.; "Multicast Negative-Acknowledgment (NACK) Building Blocks;" Internet Engineering Task Force (IETF), RFC, vol. 5401; Nov. 2008; 41 Pages.

Adamson, et al.; "NACK-Oriented Reliable (NORM) Transport Protocol;" Internet Engineering Task Force (IETF); RFC; vol. 5740; Nov. 2009; 94 Pages.
Adamson, et al.; "Quantitative Prediction of NACK-Oriented Reliable Multicast (NORM) Feedback;" Proceedings, MILCOM 2000; vol. 2; Oct. 2002; 6 Pages.
Ahlswede, et al.; "Network Information Flow;" IEEE Transactions on Information Theory; vol. 46; No. 4; Jul. 2000; pp. 1204-1216; 13 Pages.
Ahmed, et al.; "On the Scaling Law of Network Coding Gains in Wireless Networks;" IEEE; MILCOM 2007; Oct. 2007; 7 Pages.
Ali, et al.; "Source Coding With Side Information Using List Decoding;" 2010 IEEE International Symposium on Information Theory Proceedings (ISIT); IEEE; Jun. 2010; 5 Pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 Pages.
Armstrong, et al.; "Distributed Storage with Communcation Costs;" IEEE Forty-Ninth Annual Allerton Conference—Allerton House; Sep. 28-30, 2011; pp. 1358-1365; 8 Pages.
Awerbuch, et al.; "On-Line Generalized Steiner Problem;" Proceedings of the $7^{th}$ Annual ACM-SIAM Symposium on Discrete Algorithms; pp. 1-12; 1996; 12 Pages.
Baek, et al.; "An Adaptive ARQ-HARQ interworking scheme in WiMAX Systems"; Computer Networks; vol. 56; Jan. 2012; pp. 1745-1762; 18 Pages.
Baron, et al.; "Coding Schemes for Multislot Messages in Multi-channel ALOHA With Deadlines;" IEEE Transactions on Wireless Communications; vol. 1; No. 2; Apr. 2002; pp. 292-301; 10 Pages.
Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32; 32 Pages.
Berman, et al.; "Improved Approximations for the Steiner Tree Problem;" Journal of Algorithms; Chapter 39; pp. 325-334; 10 Pages.
Bhadra, et al.; "Looking at Large Networks: Coding vs. Queueing;" Proc. Of the $25^{th}$ IEEE International Conference on Computer Communications (INFOCOM); Apr. 2006; 13 Pages.
Bharath-Kumar, et al.; "Routing to Multiple Destinations in Computer Networks;" IEEE Transactions on Communications; vol. Com-31; No. 3; Mar. 1983; pp. 343-351; 9 Pages.
Bhargava, et al.; "Forward Error Correction Coding;" Mobile Communications Handbook; Part 1: Basic Principals; 1999; 18 Pages.
Birk, et al.; "Judicious Use of Redundant Transmissions in Multi-channel ALOHA Networks with Deadlines;" IEEE Journal on Selected Areas In Communications; vol. 17; No. 2; Feb. 1999; pp. 257-269; 13 Pages.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409; 8 Pages.
Bonnin, et al.; "Automatic Multi-Interface Management Through Profile Handling;" Springer; Mobile Networks and Applications; Feb. 2009; pp. 4-17; 14 Pages.
Borokhovich, et al.; "Tight bounds for Algebraic Gossip on Graphs;" Proc. Of the IEEE International Symposium on Information Theory (ISIT); Jun. 13-18, 2010; 14 Pages.
Borst, et al.; "Distributed Caching Algorithms for Content Distribution Networks"; IEEE INFOCOM; 2010 Proceedings IEEE; Mar. 14-19, 2010; 9 Pages.
Borst, et al.; "Distributed Caching Algorithms for Content Distribution Networks;" Power Point Presentation; BCAM Seminar; Bilbao, Sep. 30, 2010; 36 Pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411; 14 Pages.
Byers, et al.; "Securing bulk content almost for free"; Science Direct; Computer Communications; vol. 29; Dec. 2004; 11 Pages.
Cai, et al.; Secure Network Coding; IEEE International Symposium on Information Theory 2002; Jun. 30-Jul. 5, 2002; p. 323; 1 Page.

(56) References Cited

OTHER PUBLICATIONS

Cai, et al.; "Theory of Secure Network Coding;" IEEE Proc. Vol. 99; No. 3; pp. 421-437; Mar. 2011; 17 Pages.
Calmon et al., "Lists that are Smaller than their Parts: A Coding Approach to Tunable Secrecy;" Proceedings of the IEEE $50^{th}$ Allerton Conference on Communication, Control, and Computing; Oct. 2012; 8 Pages.
Calmon, et al.; "Lists that are smaller than their parts: A coding approach to tunable secrecy;" Allerton 2012; arXiv:1210.2126v1 [cs.IT]; Oct. 8, 2012; 8 pages.
Calmon, et al.; "Lists that are smaller than their parts: A coding approach to tunable secrecy;" Allerton 2012; RLE; Network Coding and Reliable Communications Group; Powerpoint Presentation; 46 pages.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al.; "Minimum Entropy Combinatorial Optimization Problems;" Data Structure and Algorithms, Discrete Mathematics; Aug. 17, 2010; pp. 1-16; 16 Pages.
Castro, et al.; "Upper and Lower Error Bounds for Active Learning;" The 44'th Annual Allerton Conference on Communication, Control and Computing; vol. 2, No. 2.1; 2006, 10 Pages.
Celik, et al.; "MAC for Networks with Multipacket Reception Capability and Spatially Distributed Nodes;" Proc. IEEE INFOCOM 2008; Apr. 2008; 9 Pages.
Celik; "Distributed MAC Protocol for Networks with Multipacket Reception Capability and Spatially Distributed Nodes;" Master's Thesis; MIT Department of Electrical Engineering and Computer Science; May 2007; 127 Pages.
Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 Pages.
Chakrabarti, et al.; "Approximation Algorithms for the Unsplittable Flow Problem;" Proceedings of the $5^{th}$ International Workshop on Approximation Algorithms for Combinatorial Optimization; Sep. 2005; 27 Pages.
Chakrabarti, et al.; "Approximation Algorithms for the Unsplittable Flow Problem"; Algorithmica (2007); Springer Science—Business Media, Aug. 2006; 16 Pages.
Charikar, et al.; "Approximation Algorithms for Directed Steiner Problems;" Proceedings of the $9^{th}$ ACM-SIAM Symposium on Discrete Algorithms, pp. 1-15; 1998; 15 Pages.
Chen, et al.; "Pipeline Network Coding for Multicast Streams;" ICMU Org.; 2010; 7 Pages.
Cheng et al.; "Partial Encryption of Compressed Images and Videos"; IEEE Transaction of Signal Processing; vol. 48, No. 8; Aug. 2000; 13 Pages.
Chou, et al.; "FEC and Pseudo-ARQ for Receiver-driven Layered Multicast of Audio and Video;" Data Compression Conference (DCC), 2000; Proceedings; Jan. 2000; 10 Pages.
Chou, et al.; "Practical Network Coding;" Proceedings of the $41^{st}$ Annual Allerton Conference on Communication, Control, and Computing; Oct. 2003; 10 Pages.
Christiansen, et al.; "Brute force searching, the typical set and Guesswork;" Information Theory; arXiv: 1301.6356v1 [cs.IT]; Jan. 27, 2013; 5 Pages.
Cisco Visual Networking Index: Forecast and Methodology; 2009-2014; White Paper; Jun. 2, 2010; 17 Pages.
Cloud, et al.; "Co-Designing Multi-Packet Reception, Network Coding, and MAC Using a Simple Predictive Model;" arXiv:1101.5779v1 [cs.NI]; Submitted to W.Opt 2011; Jan. 30, 2011; 8 Pages.
Cloud, et al.; "Effects of MAC approaches on non-monotonic saturation with COPE-a simple case study;" Military Communication Conference, 2011—MILCOM; Aug. 11, 2011; 7 Pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; 8 Pages.

Cloud, et al.; "Multi-Path TCP with Network Coding;" Wireless@mit—MIT Center for Wireless Networks and Mobile Computing; 2012 Inaugural Retreat; Oct. 10-11, 2012; 1 Page.
Cloud, et al.; U.S. Appl. No. 13/654,953, filed Oct. 18, 2012; 34 Pages.
Costa, et al.; "Informed Network Coding for Minimum Decoding Delay;" Fifth IEEE International Conference on Mobile Ad-hoc and Sensor Systems; Sep. 2008; pp. 80-91; 12 Pages.
Coughlin, et al.; Years of Destiny: HDD Capital Spending and Technology Developments from 2012-2016; IEEE Santa Clara Valley Magnetics Society; Jun. 19, 2012; pp. 1-28; 28 Pages.
Dana, et al.; "Capacity of Wireless Erasure Networks;" IEEE Transactions on Information Theory; vol. 52; No. 3; Mar. 2006; pp. 789-804; 16 Pages.
Dana, et al.; "Capacity of Wireless Erasure Networks;" Jan. 2006; 41 pages.
Deb, et al.; "Algebraic Gossip: A Network Coding Approach to Optimal Multiple Rumor Mongering;" Proc. Of the $42^{nd}$ Allerton Conference on Communication, Control, and Computing; Jan. 2004; 10 Pages.
Deb, et al.; "On Random Network Coding Based Information Dissemination;" Proc. Of the IEEE International Symposium on Information Theory (ISIT); Sep. 4-9, 2005; 5 Pages.
Demers, et al.; "Epidemic Algorithms for Replicated Database Maintenance;" PODC '87 Proceedings of the sixth annual ACM Symposium on Principles of distributed computing; Jan. 1987; pp. 1-12; 12 Pages.
Dias, et al.; "Performance Analysis of HARQ in WiMax Networks Considering Imperfect Channel Estimation;" The $7^{th}$ International Telecommunications Symposium (ITS 2010); 2010; 5 Pages.
Dimakis, et al.; "A Survey on Network Codes for Distributed Storage;" Proceedings of the IEEE; vol. 99; No. 3; Mar. 2011; pp. 476-489; 14 Pages.
Dimakis, et al.; "Network Coding for Distributed Storage Systems;" IEEE/ACM Transactions on Information Theory; vol. 56; No. 9; pp. 1-13; 13 Pages.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64; 64 Pages.
Dougherty et al., "Maximum Distance Separable Codes in the p Metric over Arbitrary Alphabets;" Journal of Algebraic Combinatorics, vol. 16; 2002; pp. 71-81; 11 Pages.
Effros; Distortion-Rate Bounds for Fixed-and Variable-Rate Multiresolution Source Codes; IEEE Transactions on Information Theory; vol. 45, No. 6; Sep. 1999; pp. 1887-1910; 24 Pages.
Effros; "Universal Multiresolution Source Codes;" IEEE Transactions on Information Theory; vol. 47; No. 6; Sep. 2001; pp. 2113-2129; 17 Pages.
El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421; 5 Pages.
Elias; "List Decoding for Noisy Channels;" Research Laboratory of Electronics; MIT; Technical Report 335; Sep. 20, 1957; 14 Pages.
Eryilmaz, et al.; On Delay Performance Gains From Network Coding; Information Sciences and Systems; 2006 $40^{th}$ Annual Conference on Mar. 22-24, 2006; 7 Pages.
Eschenauer, et al.; "A Key-Management Scheme for Distributed Sensor Networks;" Proceedings in the $9^{th}$ ACM Conference on Computer and Communications Security, ser. CCS '02; ACM Nov. 18-22, 2002; pp. 41-47; 8 Pages.
El Rouyaheb et al.; "Secure Network Coding for Wiretap Networks of Type II"; arXiv:0907.3493v1 [cs.IT]; Jul. 20, 2009; 23 Pages.
Karkpinski, et al.; "New Approximation Algorithms for the Steiner Tree Problems;" Technical Report, Electronic Colloquium on Computational Complexity (ECCC) TR95-030; 1995; pp. 1-17; 17 Pages.
Karp, et al.; "Randomized Rumor Spreading;" IEEE Proceeding FOCS '00 Proceedings of the 41st Annual Symposium on Foundations of Computer Science; Jan. 2000; pp. 565-574; 10 Pages.

(56) References Cited

OTHER PUBLICATIONS

Katti, et al.; "XORs in the Air: Practical Wireless Network Coding;" IEEE/ACM Transactions on Networking; vol. 16; No. 3; 2008; pp. 1-14; 14 Pages.
Katti, et al.; "XORs in The Air: Practical Wireless Network Coding;" ACM SIGCOMM '06; Computer Communications Review; vol. 36; Sep. 11-15, 2006; 12 pages.
Katz, et al.; "Introduction to Modern Cryptography;" Oct. 30, 2006; 327 pages.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480; 10 Pages.
Key, et al.; "Combining Multipath Routing and Congestion Control for Robustness;" In Proceedings of IEEE CISS, 2006, 6 Pages.
Kim, et al.; "Modeling Network Coded TCP Throughout: A Simple Model and its Validation;" VALUETOOLS '11 Proceedings of the $5^{th}$ International ICST Conference on Performance Evaluation Methodologies and Tools; May 16-20, 2011; 10 Pages.
Kim, et al.; "Modeling Network Coded TCP Throughput: A Simple Model and its Validation", Cornell University Library, http://arxiv.org/abs/1008.0420, Aug. 2010, 3 Pages.
Kim, et al.; "Network Coding for Multi-Resolution Multicast;" IEEE INFOCOM 2010; Mar. 2010; 9 pages.
Kim, et. al.; "Modeling Network Coded TCP Throughput: A Simple Model and its Validation", arXiv: 1008.0420v1 [cs.IT] Aug. 2, 2010; 9 Pages.
Kim, et al.; "Modeling Network Coded TCP Throughput: A Simple Model and its Validation", Nov. 2010, Presentation; 19 Pages.
Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686; 11 Pages.
Koetter, et al.; "An Algebraic Approach to Network Coding;" IEEE/ACM Transactions on Networking; vol. 11, No. 5; Oct. 2003; pp. 782-795; 14 Pages.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding Media using Inter-layer Network Coding;"Distributed Computing Systems (ICDCS); 2011 $31^{st}$ International Conference on Jun. 2011; 11 pages.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. Of the $42^{rd}$ Symposium on Theory of Computing (STOC); Jun. 5-8, 2010; 10 pages.
Lai; "Sequential Analysis: Some Classical Problems and New Challenges"; Statistica Sinica, vol. 11, No. 2; 2001; pp. 303-350; 48 Pages.
Landau; "Application of the Volterra Series to the Analysis and Design of an Angle Track Loop;" IEEE Transactions on Aerospace and Electronic Systems; vol. AES-8, No. 3; May 1972; pp. 306-318; 13 Pages.
Larsson, et al.; "Analysis of Network Coded HARQ for Multiple Unicast Flows;" Communication (ICC) 2010 IEEE International Conference on May 23-27, 2010 pp. 1-6; 6 Pages.
Larsson, et al.; "Multi-User ARQ;" Vehicular Technology Conference; 2006; VTC (2006-Spring); IEEE $63^{rd}$; vol. 4; May 7-10, 2006; pp. 2052-2057; 6 Pages.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388; 5 Pages.
Larsson; "Multicast Multiuser ARQ;" Wireless Communications and Networking Conference (WCNC) 2008; IEEE; Apr. 3, 2008; pp. 1985-1990; 6 Pages.

Le, et al.; "How Many Packets Can We Encode?—An Analysis of Practical Wireless Network Coding;" INFOCOM 2008; The $27^{th}$ Conference on Computer Communications, IEEE; 2008; pp. 1040-1048; 9 Pages.
Lee, et al.; "Content Distribution in VANETs using Network Coding: The Effect of Disk I/O and Processing O/H;" Proc. IEEE SECON; Jan. 2008; pp. 117-125; 9 Pages.
Lehman, et al.; "Complexity Classification of Network Information Flow Problems;" SODA 04' Proceedings of the fifteenth annual ACM-SIAM symposium on Discrete algorithms; Jan. 2004; pp. 9-10; 2 Pages.
Li, et al.; " Linear Network Coding;" IEEE Transactions on Information Theory; vol. 49; No. 2; Feb. 2003; pp. 371-381; 11 Pages.
Li, et al.; "N-in-1 Retransmission with Network Coding;" IEEE Transactions on Wireless Communications; vol. 9; No. 9; Sep. 2010; pp. 2689-2694; 6 Pages.
Li, et al.; "Robust and Flexible Scalable Video Multicast with Network Coding over P2P Network;" $2^{nd}$ International Congress on Image and Signal Processing, IEEE: Oct. 17, 2009; pp. 1-5; 5 Pages.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?;" IEEE International Symposium on Information Theory; Jun. 2007; pp. 546-550; 5 Pages.
Lima, et al.; "Secure Network Coding for Multi-Resolution Wireless Video Streaming;" IEEE Journal on Selected Areas in Communications; vol. 28; No. 3; Apr. 2010; pp. 377-388 ; 12 Pages.
Lima, et al.; "Towards Secure Multiresolution Network Coding;" IEEE Information Theory Workshop; Jun. 12, 2009; pp. 125-129; 5 Pages.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.
Luby, et al.; "The Use of Forward Error Correction (FEC) in Reliable Multicast;" Internet Society Request for Comments; RFC 3453; Dec. 2002; 18 pages.
Lucani et al.; "On Coding for Delay New Approaches based on Network Coding in Network Coding in Networks with Large Latency;" Presentation in NetCod; Slide Presentation; Jun. 16, 2009; 17 pages.
Lucani et al.; "Broadcasting in Time-Division Duplexing: A Random Linear Network Coding Approach;" presented Switzerland; Conference: NetCod 2009, Lausanne, Switzerland; Jun. 2009; 6 pages.
Lucani et al.; "On Coding for Delay—New Approaches Based on Network Coding in Networks with Large Latency;" Conference: ITA Workshop, San Diego, USA; Feb. 2009; 10 pages.
Lucani et al.; "On Coding for Delay New Approaches based on Network Coding in Networks with Large Latency;" Conference ITA Workshop, San Diego, USA; Slide Presentation; Feb. 13, 2009; 11 pages.
Lucani et al.; "Random Linear Network Coding For Time Division Duplexing: Energy Analysis;" Conference: ICC 2009, Dresden, Germany; Jun. 2009; 5 pages.
Lucani et al.; "Random Linear Network Coding for Time-Division Duplexing: when to stop talking and start listening;" Presentation in INFOCOM; Slide Presentation; Apr. 23, 2009; 10 pages.
Lucani et al.; "Random Linear Network Coding for Time-Division Duplexing: Queueing Analysis;" Conference ISIT 2009, Seoul, Korea; Jul. 2009; 5 Pages.
Lucani et al.; "Random Linear Network Coding For Time-Division Duplexing: Field Size Considerations;" Conference: GLOBECOM 2009, Hawaii, USA; Dec. 2009; 6 Pages.
Lucani, et al.; "Network Coding For Data Dissemination: It Is Not What You Know, But What Your Neighbors Don't Know;" Modeling and Optimization in Mobile, AdHoc, and Wireless Networks 2009; WiOPT 2009; $7^{th}$ International Symposium on Jun. 23-27, 2009; pp. 1-8; 8 Pages.

(56) References Cited

OTHER PUBLICATIONS

Lucani, et al.; "Network Coding Schemes for Underwater Networks;" WUWNet 07; Sep. 14, 2007; pp. 25-32; 8 Pages.
Lucani, et al.; "Systematic Network Coding for Time-Division Duplexing;" Proceedings of the IEEE International Symposium on Information Theory (ISIT); Jun. 13-18, 2010; pp. 2403-2407; 5 Pages.
Lun, et al.; "Further Results on Coding for Reliable Communication over Packet Networks;" Information Theory, ISIT 2005 Proceedings International Symposium on Sep. 4-9, 2005; 5 pages.
Lun, et al.; "On Coding for Reliable Communication Over Packet Networks;" Physical Communication; vol. 1; No. 1; Jan. 2008; pp. 10 pages.
Lun, et al.; "On Coding for Reliable Communication over Packet Networks;" LIDS Publication #2741; Jan. 2007; 33 pages.
Lun, et al.; An Analysis of Finite-Memory Random Linear Coding on Packet Streams; Modeling and Optimization in Mobile, Ad Hoc and Wireless Networks; Apr. 3-6, 2006; pp. 1-6; 6 Pages.
Lun; "Efficient Operation of Coded Packet Networks;" Ph.D. Dissertation; Massachusetts Institute of Technology; Jun. 2006; 130 pages.
Magli, et al.; "An Overview of Network Coding for Multimedia Streaming;" IEEE International Conference; Jun. 28, 2009; pp. 1488-1491; 4 Pages.
Mallat, et al.; "Adaptive Covariance Estimation of Locally Stationary Processes;" Annals of Statistics, vol. 26, No. 1; 1998; pp. 1-43; 43 Pages.
Manssour, et al.; "A Unicast Retransmission Scheme based on Network Coding;" IEEE Transactions on Vehicular Technology; vol. 61; Issue 2; Nov. 2011; 7 pages.
Mayer et al.; "A Survey of Security Issues in Multicast Communications"; IEEE Network; Nov./Dec. 1999; 12 Pages.
Maymounkov, et al.; "Methods for Efficient Network Coding;" Proc. Of the $44^{th}$ Allerton Conference on Communication, Control, and Computing; Sep. 2006; 10 pages.
Médard, et al.; "On Coding for Non-Multicast Networks;" invited paper, $41^{st}$ Allerton Annual Conference on Communication, Control; Outgrowth of supervised student research Publications of Muriel Médard and Computing; vol. 1; Oct. 2003; 9 pages.
Medard; "Some New Directions for Network Coding in Content Distribution", RLE, EECS, MIT, Seminar to Alcatel Lucent, Nov. 2010, 29 pages.
Merchant, et al.; "Analytic Modeling of Clustered RAID with Mapping Based on Nearly Random Permutation;" IEEE Transactions on Computers; vol. 45; No. 3; Mar. 1996; pp. 367-373; 7 Pages.
Metzner; "An Improved Broadcast Retransmission Protocol;" IEEE Transactions on Communications; vol. COM-32; No. 6; Jun. 1984; pp. 679-683; 5 Pages.
Mills, et al.; "On Secure Communication Over Wireless Erasure Networks;" IEEE International Symposium on Information Theory; Jul. 2008; pp. 161-165; 5 Pages.
Mosk-Aoyama, et al.; "Information Dissemination via Network Coding;" ISIT 2006; IEEE; Jul. 9-14, 2006; pp. 1748-1752; 5 Pages.
Nguyen, et al.; "Internet Media Streaming Using Network Coding and Path Diversity;" IEEE Global Telecommunications Conference; Nov. 30-Dec. 4, 2008; 5 pages.
Nguyen, et al.; "Wireless Broadcast Using Network Coding;" Vehicular Technology IEEE Transactions on Feb. 2009; vol. 58; Issue 2; 25 pages.
Nguyen, et al.; "Video Streaming with Network Coding;" Journal of Signal Processing Systems; vol. 59, Issue 3; DOI: 10.1007/s11265-009-0342-7; Jun. 2010; 25 pages.
Nobel; "Hypothesis Testing for Families of Ergodic Processes;" Bernoulli-London, vol. 12, No. 2; 2006; 21 pages.
Noguichi, et al.; "Performance Evaluation of New Multicast Architecture with Network Coding;" IEICE Transactions on Communication, E86-B; No. 6; Jun. 2003; 3 pages.
NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE GLOBECOM 2005; vol. 6; Dec. 2005; 5 pages.
Oliveira, et al.; "A Network Coding Approach to Secret Key Distribution;" IEEE Transactions on Information Forensics and Security; vol. 3; No. 3; pp. 414-423; Sep. 2008; 10 Pages.
Oliveira, et al.; "Trusted Storage Over Untrusted Networks;" IEEE Global Telecommunications Conference; Dec. 2010; pp. 1-5; 5 Pages.
Ozarow, et al.; "Wire-Tap Channel II;" Advances in Cryptology; EUROCRYPT '84, LNCS 209; Jan. 1985; pp. 33-50; 18 Pages.
ParandehGheibi, et al.; "Access-Network Association Policies for Media Streaming in Heterogeneous Environments;" Apr. 2010; pp. 1-8; 8 Pages.
Peng, et al.; "Research on Network Coding based Hybrid-ARQ Scheme for Wireless Networks;" Communication Systems (ICCS); 2010 IEEE International Conference on Nov. 17-19, 2010; pp. 218-222; 5 Pages.
Popovici, et al.; "Robust, Portable I/O Scheduling with the Disk Mimic;" Proc. USENIX Annual Tech. Conf. San Antonio, Texas, Jun. 2003; 14 pages.
Qureshi, et al.; "An Efficient Network Coding based Retransmission Algorithm for Wireless Multicast;" Personal, Indoor and Mobile Radio Communications, 2009 IEEE $20^{th}$ International Symposium on Sep. 13-16, 2009; 5 pages.
Radunovic, et al.; "Horizon: Balancing TCP Over Multiple Paths in Wireless Mesh Network;" Proc. $14^{th}$ ACM International Conference on Mobile Computing and Networking; Sep. 2008; 12 pages.
Ramanathan; "Multicast Tree Generation in Networks with Asymmetric Links;" IEEE Transactions on Networking; vol. 4; Aug. 1996; pp. 1-12; 12 Pages.
Rezaee, et al.; " Multi Packet Reception and Network Coding;" Presentation at The 2010 Military Communications Conference Unclassified Technical Program; Nov. 2, 2010; 15 pages.
Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27; 7 Pages.
Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280; 11 Pages.
Rezaee, et.al.; "Multi Packet Reception and Network Coding;" Military Communications Conference; 2010; MILCOM 2010; IEEE; Oct. 31, 2010-Nov. 3, 2010; pp. 1393-1398; 6 Pages.
Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.
Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379; 6 Pages.
Roughgarden, et al.; "How Bad is Selfish Routing?" Journal of the ACM; vol. 49, No. 2; Mar. 2002; pp. 236-259; 24 Pages.
Ruemmler, et al.; "An introduction to disk drive modeling;" IEEE Computers; vol. 27; No. 3; Mar. 17-29, 1994; 18 pages.
Ryabko, et al.; "On Hypotheses Testing for Ergodic Processes;" Information Theory Workshop; ITW'08; IEEE; 2008; pp. 281-283; 3 Pages.
Sanders, et al.; "Polynomial Time Algorithms for Network Information Flow;" $15^{th}$ ACM Symposium on Parallel Algorithms and Architectures; Jun. 2003; pp. 1-9; 9 Pages.
Sayenko, et al.; "Performance Analysis of the IEEE 802.16 ARQ Mechanism;" MSWiM'07; Oct. 22-26, 2007; pp. 314-322; 9 Pages.
Scharf; "MPTCP Application Interface Considerations draft-scharf-mptcp-ap-04;" Internet Engineering Task Force; Internet-Draft; Nov. 22, 2010; 26 pages.
Seferoglu, et al.; "Opportunistic Network Coding for Video Streaming over Wireless;" Packet Video; Nov. 2007; 10 pages.

(56) References Cited

OTHER PUBLICATIONS

Sengupta, et al.; "An Analysis of Wireless Network Coding for Unicast Sessions: The Case for Coding-Aware Routing;" in INFOCOM 2007; 26th IEEE International Conference on Computer Communications; Jun. 2007; 9 pages.
Servetto, et al.; "Constrained Random Walks on Random Graphs: Routing Algorithms for Large Scale Wireless Sensor Networks;" WSNA 02; Sep. 28, 2002; 10 pages.
Shannon, et al.; "Lower Bounds to error Probability for Coding on Discrete Memoryless Channels, I;" Information and Control; vol. 10; No. 5; Feb. 1967; pp. 65-103; 39 Pages.
Shannon, et al.; "Lower Bounds to error Probability for Coding on Discrete Memoryless Channels, II;" Information and Control; vol. 10; Issue 5; May 1967; pp. 522-552; 31 Pages.
Shannon; "Communication Theory of Secrecy Systems;" Bell System Technical Journal; vol. 28; No. 4; pp. 656-715; Oct. 1949; 60 Pages.
U.S. Appl. No. 13/890,604, filed May 9, 2013, Zeger, et al.
U.S. Appl. No. 13/655,034, filed Oct. 18, 2012, Medard, et al.
U.S. Appl. No. 13/654,953, filed Oct. 18, 2012, Zeger, et al.
U.S. Appl. No. 14/208,683, filed Mar. 13, 2014, Calmon, et al.
Feldman, et al.; "On the Capacity of Secure Network Coding;" Proc. 42nd Annual Allerton Conference on Communications, Control and Computing; Jan. 2004; 10 pages.
Haeupler, et al.; "Optimality of Network Coding in Packet Networks;" ArXiv, Feb. 17, 2011; 5 pages.
Haley, et al.; "Reversible Low-Density Parity-Check Codes;" IEEE Transactions on Information Theory; vol. 55; No. 5; May 2009; pp. 2016-2036; 21 Pages.
ITU-T Telecommunication Standardization Sector of ITU; Series T: Terminals for Telematic Services Still-image compression—JPEG-1 extensions; Information Technology—Digital compression and coding of continuous-tone still images: JPEG File Interchange Format (JFIF); International Telecommunication Union (ITU); 2012; 18 Pages.
Kim, et al.; "Transform-free analysis of the GI/G/1/K queue through the decomposed Little's formula;" Computers and Operations Research; vol. 30; No. 3; Mar. 2003; pp. 1-20; 20 Pages.
Lucani et al.; "Random Linear Network Coding for Time-Division Duplexing: when to stop talking and start listening;" Presentation in ICC; Slide Presentation; Jun. 16, 2009; 6 pages.
Moyer, et al.; "A Survey of Security Issues in Multicast Communications;" IEEE Network; vol. 13; No. 6; Nov./Dec. 1999; pp. 12-23; 12 Pages.
Rezaee, et al.; "Speeding Multicast by Acknowledgment Reduction Technique (SMART);" ArXiv:1104.2941v2 [cs.NI] Sep. 10, 2011; 6 pages.
Shenker, et al.; "Pricing in computer networks: reshaping the research agenda;" Telecommunications Policy; vol. 20, No. 3; Jan. 1996; pp. 183-201; 19 Pages.
Sherali, et al.; "Recovery of primal solutions when using subgradient optimization methods to solve Lagrangian duals of linear programs;" Elsevier Operations Research Letters 19 (Jan. 1996); pp. 105-113; 9 Pages.
Shields; "The Interactions Between Ergodic Theory and Information Theory;" IEEE Transactions on Information Theory, vol. 44, No. 6; Oct. 1998; pp. 2079-2093; 15 Pages.
Shrader, et al.; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740; 6 Pages.
Shrader, et al.; "Systematic wireless network coding;" Military Conference, 2009; MILCOM 2009; IEEE; 7 pages.
Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.
Silva, et al.; "Universal Secure Network Coding via Rank-Metric Codes;" arXiv:0809.3546v2 [cs.IT]; Apr. 27, 2010; 12 pages.
Song, et al.; "Zero-Error Network Coding for Acyclic Networks;" IEEE Transactions on Information Theory; vol. 49, No. 12; Dec. 2003; pp. 3129-3139; 11 Pages.
SongPu, et al.; Performance analysis of joint chase combining and network coding in wireless broadcast retransmission; Wireless Communication, Network and Mobile Computing 2008; WiCOM '08, 4th International Conference on Oct. 12-14, 2008; pp. 1-4; 4 Pages.
Soo Suh; "Send-On-Delta Sensor Data Transmission With A Linear Predictor;" Sensors; ISSN 1424-8220; vol. 7; No. 4; Apr. 26, 2007; pp. 537-547; 11 Pages.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5; 5 Pages.
Sundaram, et al.; "Multirate Media Streaming Using Network Coding;" Proc. 43rd Allerton Conference on Communication, Control, and Computing; Sep. 2005; 7 pages.
Sundararajan, et al.; "ARQ for Network Coding;" ISIT Proc. Of the IEEE International Symposium on Information Theory (ISIT); Jul. 6-11, 2008; pp. 1651-1655; 5 Pages.
Sundararajan, et al.; "Network Coding Meets TCP: Theory and Implementation;" Proceedings of the IEEE; vol. 99, Issue 3; Mar. 2011; pp. 490-512; 23 Pages.
Sundararajan, et al.; "Network coding meets TCP;" InfoCOM 2009; IEEE, Apr. 19-25, 2009; pp. 280-288; 9 Pages.
Sundararajan, et al.; "On Queueing in Coded Networks—Queue Size Follows Degrees of Freedom;" IEEE Information Theory Workshop on Information Theory for Wireless Networks (ITW); Jul. 1-6, 2007; 6 Pages.
Teerapittayanon, et al.; "Network Coding as a WiMAX Link Reliability Mechanism;" Multiple Access Communication; Lectures Notes in Computer Science; vol. 7642; 2012; 12 Pages.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; 7th International ITG Conference on Jan. 14-16, 2008; 6 pages.
Tosun, et al.; "Efficient Multi-Layer Coding and Encryption of MPEG Video Streams;" Proc. 2000 IEEE International Conference on Multimedia and Expo; vol. 1; 2000; pp. 119-122; 4 Pages.
Tosun, et al.; "Lightweight Security Mechanisms for Wireless Video Transmission;" Proc. Intl. Conference on Information Technology, Coding and Computing; Apr. 2001; pp. 157-161; 5 Pages.
Tran, et al.; "A Hybrid Network Coding Technique for Single-Hop Wireless Networks;" IEEE Journal on Selected Areas in Communications; vol. 27; No. 5; Jun. 2009; pp. 685-698; 14 Pages.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; 6 Pages.
Trung, et al.; "Quality Enhancement for Motion JPEG Using Temporal Redundancies;" IEEE Transactions on Circuits and System for Video Technology, vol. 18; No. 5; May 2008; pp. 609-619.
Tsatsanis, et al.; "Network Assisted Diversity for Random Access Wireless Data Networks;" Signals, Systems & amp; Computers; IEEE; vol. 1; Nov. 1-4, 1988; pp. 83-87; 5 Pages.
Valancius, et al.; "Greening the Internet with Nano Data Centers;" Proc. 5th International Conference on Emerging Networking Experiments and Technologies; CoNEXT 2009; ACM 2009; Dec. 1-4, 2009; pp. 37-48; 12 Pages.
Vasudevan, et al.; "Algebraic Gossip on Arbitrary Networks;" arXiv:0901.1444; Jan. 2009; 5 pages.
Vellamhi, et al.; "Throughput and Latency in Finite-Buffer Line Networks;" IEEE Transactions on Information Theory; vol. 57; No. 6; Jun. 2011; pp. 3622-3643; 22 Pages.
Vien, et al.; "Network Coding-based Block ACK for Wireless Relay Networks;" Proceedings of IEEE Vehicular Technology Conference (VTC2011-Spring); May 2011; 5 pages.
Vien, et al.; "Network Coding-based ARQ Retransmission Strategies for Two-Way Wireless Relay Networks;" Software, Telecom-

(56) References Cited

OTHER PUBLICATIONS munications and Computer Networks (SoftCOM) 2010; International Conference on Sep. 23-25, 2010; 5 pages.
Vilela, et al.; "Lightweight Security for Network Coding;" IEEE International Conference on Communications; May 2008; 5 pages.
Wachter-Zeh; "Bounds on List Decoding of Rank-Metric Codes;" Universite De Rennes 1; Powerpoint Presentation; Sep. 18, 2013; 46 pages.
Wang et al.; "Guest Editorial Wireless Video Transmission"; IEEE Journal on Selected Areas in Communications; vol. 28, No. 3; Apr. 2010; pp. 297-298; 2 Pages.
Wang, et al.; "Capacity-Delay Tradeoff for Information Dissemination Modalities in Wireless Networks;" in Information Theory; ISIT 2008; IEEE International Symposium; Jul. 2008; pp. 677-681; 5 Pages.
Wang, et al.; "Embracing Interference in Ad Hoc Networks Using Joint Routing and Scheduling with Multiple Packet Reception;" in INFOCOM 2008; The $27^{th}$ Conference on Computer Communications; IEEE; Apr. 2008; pp. 1517-1525; 9 Pages.
Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23; 23 Pages.
Widmer, et al.; "Network Coding for Efficient Communication in Extreme Networks;" Applications, Technologies, Architectures, and Protocols for Computer Communication; Aug. 2005; pp. 284-291; 8 pages.
Wieselthier, et al.; "Energy-Aware Wireless Networking with Directional Antennas: The Case of Session-Based Broadcasting and Multicasting"; IEEE Transactions on Mobile Computing; vol. 1, No. 3; Jul.-Sep. 2002; pp. 176-191; 16 Pages.
Wieselthier, et al.; "Energy Efficient Broadcast and Multicast Trees in Wireless Networks;" Mobile Networks and Applications 7; Jan. 2002; pp. 481-492; 12 Pages.
Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17; 5 Pages.
Wu, et al.; "A Trellis Connectivity Analysis of Random Linear Network Coding with Buffering;" Proc. Of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580; 5 Pages.
Yeung; "Multilevel Diversity Coding with Distortion;" IEEE Transactions on Information Theory; vol. 41, No. 2; Mar. 1995; pp. 412-422; 11 Pages.
Yong, et al.; "XOR Retransmission in Multicast Error Recovery;" Networks 2000; ICON; Proceedings IEEE International Conference on Sep. 5-8, 2000; pp. 336-340; 5 Pages.
Yu, et al.; "High-Throughput Random Access Using Successive Interference Cancellation in a Tree Algorithm;" IEEE Transactions on Information Theory; vol. 53; No. 12; Dec. 2007; pp. 4628-4639; 12 Pages.
Yun, et al.; "Towards Zero Retransmission Overhead: A Symbol Level Network Coding Approach to Retransmission;" IEEE Transactions on Mobile Computing; vol. 10; No. 8; Aug. 2011; pp. 1083-1095; 13 Pages.
Zeger; "Packet Erasure Coding with Random Access to Reduce Losses of Delay Sensitive Multislot Messages;" IEEE; Paper ID #900482; Aug. 18, 2009; pp. 1-8; 8 Pages.
Zhang, et al.; "Collision Resolution in Packet Radio Networks Using Rotational Invariance Techniques;" IEEE Transactions on Communication; vol. 50; No. 1; Jan. 2002; pp. 146-155; 10 Pages.
Zhang, et al.; "Optimized Multipath Network Coding in Loss Wireless Networks;" ICDCS '08 Proceedings of the 2008 The $28^{th}$ International Conference on Distributing Computing Systems; Jan. 2008; 12 pages.

Zhang, et al.; Dual XOR In the AIR: A Network Coding Based Retransmission Scheme for Wireless Broadcasting; Communications (ICC) 2011 IEEE International Conference on Jun. 5-9, 2011; pp. 1-6; 6 Pages.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137; 13 Pages.
Zhao, et al.; "On analyzing and improving COPE performance;" Information Theory and Applications Workshop (ITA), Jan. 2010; pp. 1-6; 6 Pages.
Zhu, et al.; "Multicast with Network Coding in Application-Layer Overlay Networks;" IEEE Journal on Selected Areas in Communications; vol. 22; No. 1; Jan. 2004; pp. 1-13; 13 Pages.
European Extended Search Report dated Oct. 10, 2016 for corresponding European Application No. 14772997.4; 4 Pages.
Korean Notice of Rejection (with English Translation) dated Dec. 1, 2016 corresponding to Korean Application No. 10-2015-7029058; 13 Pages.
Japanese Notice of Rejection (with English Translation) dated Oct. 6, 2016 corresponding to Japanese Application No. 2016-502026; 6 Pages.
International Preliminary Report on Patentability of the ISA for PCT/US2014/026015 dated Sep. 15, 2015; 9 Pages.
Notification of Transmittal of the International Search Report and the Written Opinion of the International Searching Authority, or the Declaration, PCT/US2014/26015, Oct. 10, 2014, 12 pages.
Fan, et al.; "Reliable Relay Assisted Wireless Multicast Using Network Coding;" IEEE Journal on Selected Areas in communications; vol. 27; No. 5; Jun. 2009; pp. 749-762; 14 Pages.
Feizi, et al.; "Locally Adaptive Sampling;" Communication, Control, and Computing; 2010; $48^{th}$ Annual Allerton Conference, IEEE; Sep. 29, 2010; pp. 152-159; 8 Pages.
Feizi, et al.; "On Network Functional Compression;" arXiv online repository; URL: http://arxiv.org/pdf/1011.5496v2.pdf; Nov. 30, 2010p pp. 1-60; 60 Pages.
Feizi, et al.; "When Do Only Sources Need to Compute? On Functional Compression in Tree Networks;" $47^{th}$ Annual Allerton Conference, IEEE; Sep. 30, 2009; pp. 447-454; 8 Pages.
Feizi, et al.; "Cases Where Finding a Minimum Entropy Coloring of a Characteristic Graph is a Polynomial Time Problem;" IEEE International Symposium on Information Theory; Jun. 13, 2010; pp. 116-120; 5 Pages.
Ferner, et al.; "Toward Sustainable Networking: Storage Area Networks with Network Coding;" Fiftieth Annual Allerton Conference; IEEE; Oct. 1-5, 2012; pp. 517-524; 8 Pages.
Ford; "Architectural Guidelines for Multipath TCP Development;" Internet Engineering Task Force; Internet-Draft; Dec. 8, 2010; 17 Pages.
Ford; "TCP Extension for Multipath Operation with Multiple Addresses draft-ford-mptcp-multiaddressed-03;" Internet Engineering Task Force; Internet-Draft; Mar. 8, 2010; 35 Pages.
Forney; "Exponential Error Bounds for Erasure, List, and Decision Feedback Schemes;" IEEE Transactions on Information Theory; vol. IT-14; No. 2; Mar. 1968; pp. 206-220; 15 Pages.
Fragouli, et al.; "Wireless Network Coding: Opportunities & Challenges;" MILCOM; Oct. 2007; 8 Pages.
Frossard, et al.; "Media Streaming With Network Diversity;" Invited Paper; Proceedings of the IEEE; vol. 96, No. 1; Jan. 2008; pp. 39-53; 15 Pages.
Galbraith, et al.; (HGST); "Iterative Detection Read Channel Technology in Hard Disk Drives;" Whitepaper; Nov. 2008; 8 Pages.
Garcia-Luna-Aceves; "Challenges: Towards Truly Scalable Ad Hoc Networks;" MobiCom 2007; Sep. 2007; pp. 207-214; 8 Pages.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96; 6 Pages.
Ghaderi, et al.; Reliability Gain of Network Coding in Lossy Wireless Networks; Infocom 2008; The $27^{th}$ Conference on Computer Communications IEEE; Apr. 13-18, 2008; 5 Pages.

(56) References Cited

OTHER PUBLICATIONS

Gheorghiu, et al.; "Multipath TCP with Network Coding for Wireless Mesh Networks;" IEEE Communications (ICC) 2010 International Conference; May 23-27, 2010; 5 Pages.

Gheorghiu, et al.; "On the Performance of Network Coding in Multi-Resolution Wireless Video Streaming;" IEEE International Symposium on Jun. 9-11, 2010; 6 Pages.

Ghez, et al.; "Stability Properties of Slotted Aloha with Multipacket Reception Capability;" IEEE Transactions on Automatic Control; vol. 33; No. 7; Jul. 1988; pp. 640-649; 10 Pages.

Gkantsidis, et al.; "Cooperative Security for Network Coding File Distribution;" Proc. IEEE Infocom; Apr. 2006; 13 Pages.

Gollakota, et al.; "ZigZag Decoding: Combating Hidden Terminals in Wireless Networks;" SIGCOMM 08; August 17-22; pp. 159-170; 12 Pages.

Golrezaei, et al.; "FemtoCaching: Wireless Video Content Delivery Through Distributed Caching Helpers;" arXiv:1109.4179v2; Apr. 7, 2012; pp. 1-11; 11 Pages.

Grant, et al.; "Graph Implementation for Nonsmooth Convex Programs;" LNCIS 371; Springer-Verlag Limited; Jan. 2008; pp. 95-110; 16 Pages.

Gupta; "The Capacity of Wireless Networks;" IEEE Transactions on Information Theory; vol. 46; No. 2; Mar. 2000; pp. 388-404; 17 Pages.

Guruswami; "Algorithmic Results in List Decoding;" Foundations and Trends in Theoretical Computer Science; vol. 2, No. 2; Jan. 2006; pp. 107-195; 91 Pages.

Guruswami; "List decoding of binary codes (A brief survey of some recent results);" Coding and Cryptology, ser. Lecture Notes in Computer Science; Springer Berlin/Heidelberg; vol. 5557 Jan. 2009 pp. 97-106; 10 Pages.

Guruswami; "List Decoding of Error-Correcting Codes;" Thesis, MIT; Cambridge, MA; Sep. 2001; 315 pages.

Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.

Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.

Haeupler; "Analyzing Network Coding Gossip Made Easy;" Proc. Of the 43$^{rd}$ Symposium on Theory of Computing (STOC); Jan. 2011, 13 pages.

Halloush, et al.; "Network Coding with Multi-Generation Mixing: Analysis and Applications for Video Communication;" IEEE International Conference on Communications; May 19, 2008; pp. 198-202.

Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.

Han, et al.; "On Network Coding for Security;" IEEE Military Communications Conference; Oct. 2007; pp. 1-6.

Hassner, et al.; "4K Bye-Sector HDD-Data Format Standard;" Windows Hardware and Driver Central; San Jose, CA; Aug. 14, 2013; 5 pages.

Ho, et al.; "A Random Linear Network Coding Approach to Multicast;" IEEE Transactions on Information Theory; vol. 52; No. 10; Oct. 2006, pp. 4413-4430.

Ho, et al.; "Byzantine Modification Detection in Multicast Networks using Randomized Network Coding;" IEEE; ISIT; Jun. 27-Jul. 2, 2004; p. 144.

Ho, et al.; "Network Coding from a Network Flow Perspective;" ISIT; Jun.-Jul. 2003; 6 pages.

Ho, et al.; "On Randomized Network Coding;" Proceedings of 41$^{st}$ Annual Allerton Conference on Communications, Control and Computing; Oct. 2003; 10 pages.

Ho, et al.; "On the utility of network coding in dynamic environments;" International Workshop on Wireless AD-HOC Networks (IWWAN); 2004; pp. 1-5.

Ho, et al.; "The Benefits of Coding over Routing in a Randomized Setting;" Proceedings of 2003 IEEE International Symposium on Information Theory; Jun. 2003; pp. 1-6; 6 Pages.

Ho, et al.; "The Benefits of Coding over Routing in a Randomized Setting;" IEEE; ISIT Jun. 29-Jul. 4, 2003; p. 442; 1 Page.

Hofri; "Disk Scheduling: FCFS vs. SSTF Revisited;" Communications of the ACM; vol. 23; No. 11; Nov. 1980; pp. 645-653.

Hong, et al.; Network-coding-based hybrid ARQ scheme for mobile relay networks; Electronics Letters; vol. 46; No. 7; Apr. 1, 2010; 2 pages.

International Disk Drive Equipment and Materials Assoc.; "Advanced Standard;" in Windows Hardware Engineering Conf.; May 2005; 11 pages.

Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.

Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.

Jaggi, et al.; "Low Complexity Algebraic Multicast Network Codes;" Proceedings of the IEEE International Symposium on Information Theory; Jul. 4, 2003; 1 page.

Jaggi, et al.; "Resilient Network Coding in the Presence of Byzantine Adversaries;" Proc. IEEE INFOCOM; May 2007; 9 pages.

Jakubczak, et al.; "One-Size-Fits-All Wireless Video;" ACM SigComm Hotnets 2009; 6 pages.

Jamieson, et al.; "PPR: Partial Packet Recovery for Wireless Networks;" SIGCOMM 07; Aug. 27-31, 2007; 12 pages.

Jamieson, et al.; "PPR: Partial Packet Recovery for Wireless Networks;" Presentation; SIGCOMM 07; Aug. 27-31, 2007; 25 pages.

Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.

Ji, et al.; "A network coding based hybrid ARQ algorithm for wireless video broadcast;" Science China; Information Sciences; vol. 54; No. 6; Jun. 2011; pp. 1327-1332.

Jin, et al.; "Adaptive Random Network Coding in WiMAX;" Communications, 2008; ICC'08 IEEE International Conference on May 19-23, 2008; 5 pages.

Jin, et al.; "Is Random Network Coding Helpful in WiMax;" IEEE 27$^{th}$ Conference on Computer Communications; Apr. 2008; 5 pages.

Jolfaei, et al.; "A New Efficient Selective Repeat Protocol for Point-To_Multipoint Communication;" Communications 1993; ICC'93 Genova Technical Program, Conference Record; IEEE International Conference On May 23-26, 1993; vol. 2; pp. 1113-1117.

European Response to Communication Rule 161 EPD dated Apr. 11, 2023 for European Application No. 21783630.3, filed Oct. 18, 2023; 22 Pages.

Japanese Voluntary Amendment (with claims in English) dated Dec. 14, 2023 for Japanese Application No. 2023-513184; 7 Pages.

Galligan et al.; "Block turbo decoding with ORBGRAND"; arXiv:2207.11149v2; Aug. 9, 2022; 5 Pages.

Galligan et al.; "IGRAND: decode any product code"; Globecom 2021; 2021 IEEE Global Communications Conference; 6 Pages.

Sariedden et al.; "Soft-input, soft-output joint detection and GRAND"; arXiv:2207.10836v1; Jul. 22, 2022; 6 Pages.

PCT International Search Report and the Written Opinion of the International Search Authority dated Dec. 18, 2023 for International Application No. PCT/US2023/072800; 19 Pages.

Dummit et al.; "Chapter 13—Field Theory"; Abstract Algebra; Third Edition; John Wiley and Sons, Inc.; 2004; 1 Page.

* cited by examiner

Algorithm 1 Hybrid Universal Network-Coding Cryptosystem (HUNCC)

---

Input: At Alice, $k_u$ messages $M = [M_1; \ldots; M_{k_u}] \in F_{q^u}^{k_u}$ of length $k_b \in F_2$ bits each Encoding scheme at Alice:

1: Stage 1: Individual secrecy encoding
2: For $u \geq 1$, represent the $k_u$ messages in a block $[M^{(1)}, \ldots, M^{(\lceil k_b/u \rceil)}] \in F_{2^u}$
3: for each column $i \in \{1, \ldots, \lceil k_b/u \rceil\}$ in the block $[M^{(1)}, \ldots, M^{(\lceil k_b/u \rceil)}]$ do
4: $\quad X^{(i)} = M^{(i)} G_{IS}$
5: end for
6: Stage 2: Public-key encryption
7: for each path $1 \leq i \leq c$ which support cryptosystem do
8: $\quad b_i \in F_2^{k_b} \leftarrow [X_i^{(1)}, \ldots, X_i^{(\lceil k_b/u \rceil)}] \in F_{2^u}$
9: $\quad y_i = \text{Enc}(b_i, p_i)$
10: end for Transmission over the multipath network:

11: for each path $1 \leq i \leq c$ which support cryptosystem do
12: $\quad$ Transmit $y_i$
13: end for
14: for each remaining path $1 \leq i \leq (l - c)$ without cryptosystem do
15: $\quad$ Transmit $y_i = [X_i^{(1)}, \ldots, X_i^{(\lceil k_b/u \rceil)}] \in F_{2^u}$ (if required $y_i \in F_2^{k_b} \leftarrow y_i \in F_{2^u}$)
16: end for Decoding scheme at Bob:

17: Stage 1: Public-key decryption
18: for each path $1 \leq i \leq c$ with support cryptosystem do
19: $\quad [X_i^{(1)}, \ldots, X_i^{(\lceil k_b/u \rceil)}] \leftarrow \text{Dec}(y_i, s_i)$
20: end for
21: Stage 2: Individual secrecy decoding
22: for each column $i \in \{1, \ldots, \lceil k_b/u \rceil\}$ in the block $[X^{(1)}, \ldots, X^{(\lceil k_b/u \rceil)}]$ do
23: $\quad (M_1^i; \ldots; M_{l-c}^i) = H_{IS} X^i$
24: $\quad (M_{l-c+1}^i; \ldots; M_l^i) = \tilde{G}_{IS} X^i$
25: end for Output: At Bob, $M = [M_1; \ldots; M_{k_u}] \in F_{q^u}^{k_u}$

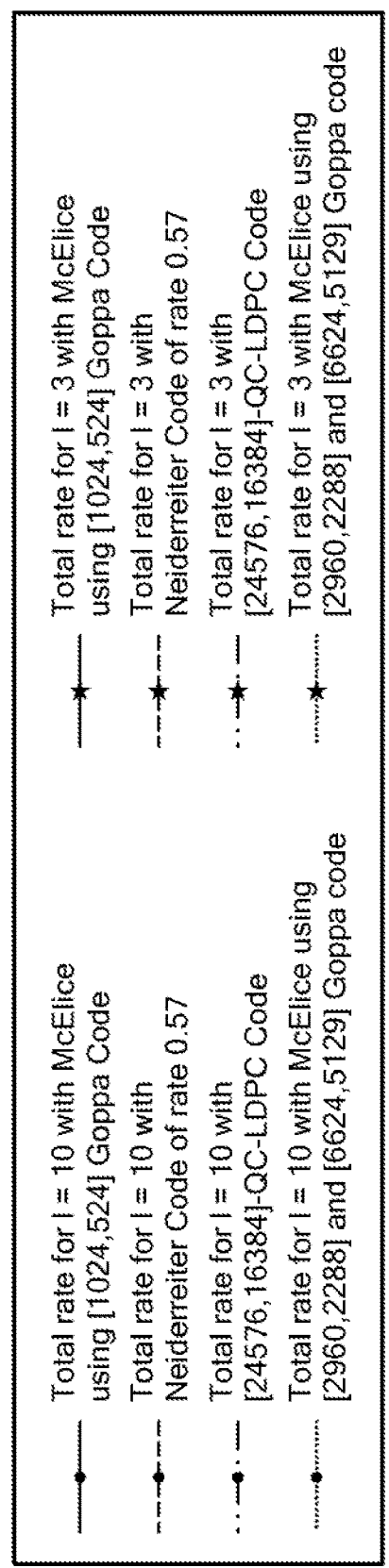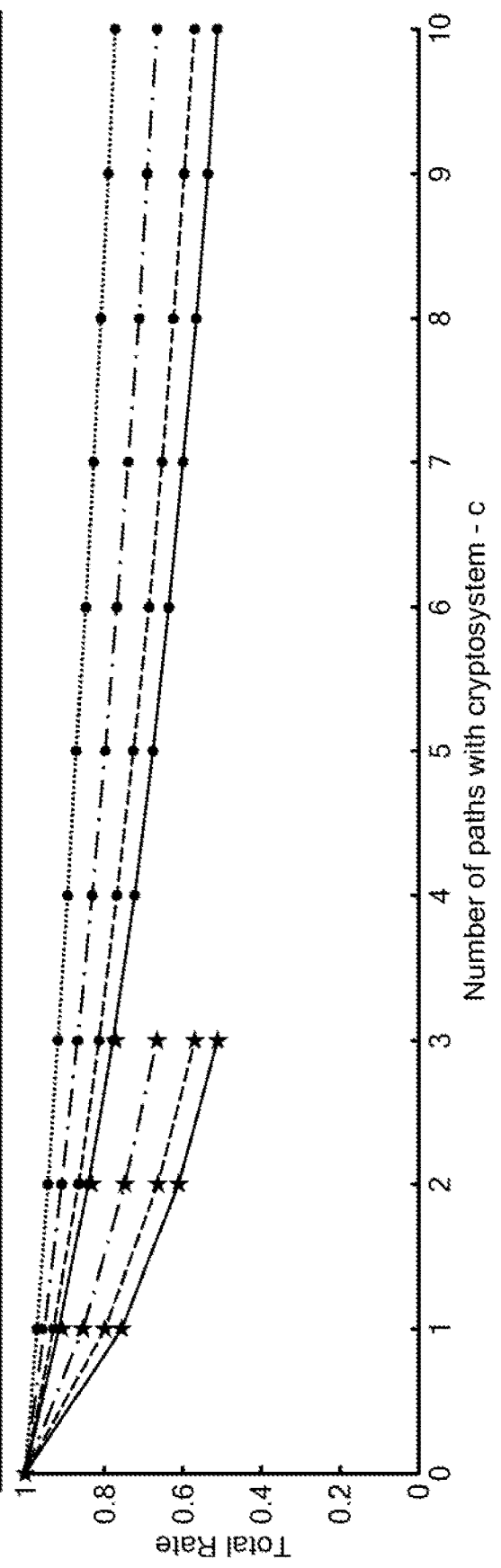
FIG. 11 Continued

NETWORK CODING-BASED POST-QUANTUM CRYPTOGRAPHY

CROSS-REFERENCE TO RELATED APPLICATION

This application claims the benefit of U.S. Provisional Application No. 63/072,430, filed Aug. 31, 2020, the entire contents of which are incorporated herein by reference.

STATEMENT REGARDING FEDERALLY SPONSORED RESEARCH

This invention was made with Government support under Grant No. N6833518C0179 awarded by the Office of Naval Research (ONR). The Government has certain rights in the invention.

BACKGROUND

The connection between information theory and cryptography goes back to Claude Shannon's work in security, which inspired his seminal work on communications. There, he defined the information-theoretic notion of perfect secrecy when studying the setting where two users, Alice and Bob, wish to communicate privately in the presence of an eavesdropper, Eve. Under perfect secrecy, $H(M|X)=H(M)$, where H is the entropy, M is the private message, and X is the encrypted message sent through the communication network. If Eve can observe the encrypted message X completely (i.e. Eve is "strong"), perfect secrecy can only be obtained if both Alice and Bob share a random key or "one-time pad", R, with entropy as large as the message, i.e. $H(R) \geq H(M)$. Such a system is shown in FIG. 1, in which Alice sends two messages $M_1$ and $M_2$ to Bob through two different paths, adding the shared key $R_{K_1}$ to $M_1$ on the first path and adding the shared key $R_{K_2}$ to $M_2$ on the second path. Because only Alice and Bob know the shared keys, only they can recover the two messages $M_1$ and $M_2$ from these sums.

The theoretical necessity for Alice and Bob to share large secret keys is often non-practical, e.g. if Alice and Bob are geographically distant. Hence, much effort has been devoted to developing alternative solutions which relax the perfect secrecy condition. One such relaxation comes from assuming that the eavesdropper has limited computational power. Such schemes, referred to as "computationally secure" in this disclosure, rely on the conjecture that certain one-way functions are hard to invert. In such schemes, Alice encrypts the private message using a one-way function before sending it to Bob. This function should be hard for Eve to invert, but inversion for Bob should be not only possible, but efficient if he possesses the right key. One way to achieve this is via "public-key cryptography" as that phrase is known in the art.

A public-key cryptosystem consists of an encryption function Enc(·), a decryption function Dec(·), a secret key s, and a public key p. The encryption function uses the public key to encrypt the private message M into Enc(M,p). The decryption function uses the secret key to decrypt the encrypted message M=Dec[Enc(M,p),s]. The critical theoretical property is that decrypting the encrypted message without the secret key is computationally expensive. Although there are many ways of characterizing this, we will focus on the notion of "security level". Informally, a public-key cryptosystem has security level b, also referred to as being "b-bit secure", if the number of operations expected to be required to decode the encrypted message, without knowledge of the secret key, is on the order of $2^b$. The critical practical property is that the secret key s has much less entropy than the message(s) being communicated, which enables practical secret communications.

One of the first, and most widely used, public-key cryptosystems is the Rivest-Shamir-Adleman (RSA) cryptosystem. The security of RSA relies on the conjectured hardness of two mathematical problems: integer factorization and the RSA problem. In 1994, however, Peter Shor presented a polynomial-time algorithm for integer factorization, known as Shor's Algorithm—with the caveat that the algorithm runs on a quantum computer. In other words, if sufficiently large quantum computers are ever to be built, Shor's Algorithm can be used to break the RSA cryptosystem. This development subsequently led to an increased interest in cryptosystems which are resilient to quantum attacks, a field known as "post-quantum cryptography."

An early candidate for post-quantum cryptography, known as the "McEliece cryptosystem," was introduced in 1978 and its operation is shown in FIG. 2. This cryptosystem uses a private key p, generated by Bob and given to Alice, that specifies a particular linear code used by Bob that is able to correct up to a certain number of errors, denoted t. To send a message, Alice randomly generates a binary vector z, and adds this vector to an encoding of the message according to the particular linear code specified by p to form the encrypted messages $E(M_1,z,p)$ and $E(M_2,z,p)$ as shown. The addition of the vector z introduces t deliberate "errors" that Bob is able to correct with knowledge of the proper code, but it is computationally hard for Eve to correct.

There are no known attacks to the McEliece cryptosystem that use Shor's Algorithm. Apart from having no known quantum attacks, its encryption and decryption algorithms are faster than those of RSA. Two main disadvantages of the McEliece cryptosystem are: 1) in usual applications, the size of the public key is much larger than that of RSA, and 2) it suffers from a large communication overhead, with a communication rate around 0.5 in the original paper. The illustrative McEliece cryptosystem of FIG. 2 indicates a rate that has been increased to about 0.772 using subsequent improvements, but even this increase leaves a rather large penalty to the communication rate.

The original McEliece scheme used binary Goppa codes. One may be tempted to increase the communication rate by changing the parameters of the Goppa code. However, a key result in the literature pertaining to the communication rate gave a polynomial time algorithm for distinguishing the matrix of a high rate Goppa code from a random matrix. Therefore, the security of high rates Goppa code may not be guaranteed. Another idea is to look at families of codes, other than Goppa codes, that yield higher rates. However, most candidates for such codes have been cryptographically broken already.

In parallel with the advances in computational security, another relaxation on perfect privacy was considered in the literature, mostly by information theorists. Instead of restricting the computational power of the eavesdropper, in "physical layer security" one limits how much information Eve can obtain about the encrypted message, leading to a so-called "weak Eve". In such a paradigm, depicted in FIG. 3 for contrast with a "strong Eve", it may be assumed that the weak eavesdropper $E_w$ can observe any set w out of a total of n transmitted symbols, where w is strictly less than n. Denoting this set by $Y_{E_w}$, it was shown that there exist encryption codes with communication rate $$\frac{n-w}{n}$$

which do not leak any information about the message to the eavesdropper, i.e. $H(M|Y_{E_w})=H(M)$.

But perfect secrecy using physical layer security comes with a significant price, namely decreasing the rate of the legitimate communication. This was shown in the seminal 1975 work of Wyner, where he introduced the non-constructive (NC) wiretap channel depicted in FIG. 4—the analog of the classical Alice, Bob and Eve triple under the physical layer security assumption.

In an effort to increase the efficiency in terms of rate, yet another relaxation of the perfect secrecy of Shannon was introduced, namely "individual secrecy" as illustrated in FIG. 5. This concept is best explained in a network setup, where Alice has many messages to send to Bob, say $M_1, \ldots, M_m$, and a weak Eve may observe any w of them. By increasing the rate beyond the limits given by the wiretap channel of Wyner, it is inevitable that information will be leaked. Yet, individual secrecy guarantees that no information at all leaks about any individual message. Thus, as shown in FIG. 5, Alice sends different linear combinations of the messages $M_1$ and $M_2$ to Bob on the two different paths, under the assumption that Eve will be able to intercept all data on less than all of the paths (e.g. the single Path 2 in FIG. 5). Since Bob receives all of the messages, he is able to invert these linear combinations to recover the initial messages $M_1$ and $M_2$. In the example of FIG. 5, Bob recovers $M_2$ by subtracting the Path 1 message from the Path 2 message, and recovers $M_i$ by subtracting $M_2$ from the Path 1 message; in general, this process is accomplished by inverting a matrix. However, Eve is unable to untangle the combination of the messages because she received only a subset of them.

The notion of individual secrecy crystallizes this concept by guaranteeing that $H(M_i|Y_{E,w})=H(M_i)$, for all i=1, ..., m. Note that situation provides perfect secrecy for a subset of messages, i.e. $H(M_1, \ldots, M_m|Y_{E,w})=H(M_1, \ldots, M_m)$, but not for all of the messages as in the Wyner or Shannon models. In other words, the information that Eve obtains from her observation does not help her decipher each individual message—rather it is information about the combination of the messages. Individual secrecy is definitely a weaker notion of security, yet it often allows a system designer to increase the rate drastically, sometimes even making the encryption process free in terms of rate, as indicated in FIG. 5. While there is no doubt that efficient rates are beneficial, the assumptions of physical layer security, namely that Eve does not experience a worse channel than Bob, are hard to enforce in practice.

SUMMARY OF DISCLOSED EMBODIMENTS

Embodiments of the concepts, techniques, and structures disclosed herein provide a novel Hybrid Universal Network-Coding Cryptosystem (hereinafter "HUNCC") to obtain secure post-quantum cryptography at high communication rates. The secure network-coding scheme is hybrid in the sense that it combines information-theory security with cryptographic security, as may be provided by public-key cryptography, especially post-quantum cryptography. In addition, the scheme is general and can be applied to any communication network, and to any public-key cryptosystem. We take a computational viewpoint, and construct a coding scheme in which an arbitrary secure cryptosystem is utilized on a subset of the links, while a pre-processing similar to the one in individual security is utilized. Under this scheme, we realize 1) a computational security guarantee for an adversary which observes the entirety of the links; 2) an information-theoretic security guarantee for an adversary which observes only a subset of the links; and 3) information rates which approach the capacity of the network.

One advantage of our scheme is that, to guarantee any desired computational security level, it is sufficient to encrypt a single link, or a small part of the data transmitted, using a computational post-quantum scheme. That is, using HUNCC, we can ensure post-quantum security in networks where it is not possible to use public-key encryption over all the links in the network. In addition, the information rate approaches 1 as the number of communication links increases. As a concrete example, in a multipath network with three links, using a 128-bit computationally secure McEliece cryptosystem only over one link, we obtain a 128-bit computational security level over all paths with a total information rate of 0.91 in the network.

Thus, a first embodiment is a method of securely communicating a plurality of data blocks. The method includes receiving, using a first data channel, a first message that comprises an encryption of a first encoding of the plurality of data blocks. The method also includes receiving, using a second data channel, a second message that comprises an unencrypted second encoding of the plurality of data blocks. The method further includes decrypting the encryption of the first message to obtain the unencrypted first encoding of the plurality of data blocks. And the method includes recovering each message in the plurality of messages using the unencrypted first encoding and the unencrypted second encoding of the plurality of data blocks.

In some embodiments, the first data channel and the second data channel comprise different transmission media.

In some embodiments, the first data channel and the second data channel comprise different utilization times of a single transmission medium.

In some embodiments, the encryption comprises a public-key encryption.

In some embodiments, the encryption comprises a post-quantum encryption.

In some embodiments, recovering comprises decoding the unencrypted first and second encodings according to a linear network code.

In some embodiments, decoding comprises decoding according to an individually secure code.

In some embodiments, receiving the first message or receiving the second message comprises correcting one or more errors.

Another embodiment is an apparatus for securely communicating a plurality of data blocks. The apparatus includes a computing processor and a non-volatile memory storing computer program code that, when executed by the computing processor, performs various processes. One of these processes includes receiving, using a first data channel, a first message that comprises an encryption of a first encoding of the plurality of data blocks. Another of these processes includes receiving, using a second data channel, a second message that comprises an unencrypted second encoding of the plurality of data blocks. Yet another of these processes includes decrypting the encryption of the first message to obtain the unencrypted first encoding of the plurality of data blocks. And still another of these processes includes recovering each message in the plurality of messages using the unencrypted first encoding and the unencrypted second encoding of the plurality of data blocks.

In some embodiments, the first data channel and the second data channel comprise different transmission media.

In some embodiments, the first data channel and the second data channel comprise different utilization times of a single transmission medium.

In some embodiments, the encryption comprises a public-key encryption.

In some embodiments, the encryption comprises a post-quantum encryption.

In some embodiments, recovering comprises decoding the unencrypted first and second encodings according to a linear network code.

In some embodiments, decoding comprises decoding according to an individually secure code.

In some embodiments, receiving the first message or receiving the second message comprises correcting one or more errors.

It is appreciated that the concepts, techniques, and structures disclosed herein may be embodied by a person having ordinary skill in the art in other ways without deviating from the teachings herein.

BRIEF DESCRIPTION OF THE DRAWINGS

The manner of making and using the disclosed subject matter may be appreciated by reference to the detailed description in connection with the drawings, in which like reference numerals identify like elements.

FIG. 8 shows processes in a method for encoding, transmitting, and decoding data according to a HUNCC embodiment.

The drawings are not necessarily to scale, or inclusive of all elements of a system, emphasis instead generally being placed upon illustrating the concepts, structures, and techniques sought to be protected herein.

DETAILED DESCRIPTION

In accordance with embodiments of the concepts, techniques, and structures disclosed herein, a hybrid universal network-coding cryptosystem (HUNCC) obtains post-quantum cryptography at high information rates. In this secure network-coding scheme, we combine computational security principles with physical layer security primitives, thus introducing a hybrid system which relies on both individual secrecy, and computational secure cryptosystems.

We illustrate this concept via a multi-path secure transmission scheme, where multiple messages are to be sent between Alice and Bob, using parallel links. By doing so, we are able to address one of the main shortcomings of physical layer security, namely the assumption that an eavesdropper cannot observe all the messages sent between Alice and Bob. In the system disclosed herein, Eve may in fact observe the entirety of the transmission between Alice and Bob; i.e. Eve may be strong.

We will make an assumption on Eve's computational power, however, similar to computationally secure systems. But instead of encrypting the entirety of the messages from Alice using public-key cryptography, we only encrypt over some of the communication links; in some embodiments, as few as just one of the links. Under the computational limitation assumption, the links that are encrypted are analogous to losses for Eve—and thus, we may now employ traditional techniques from physical layer security codes. In other words, we are able to enforce that the eavesdropper only observes part of the messages, via cryptography, under the computational limitation assumption. This, in turn, allows an increase in the communication rate, similar to what is done in individual secrecy, while still providing security guarantees that are computationally strong. If Alice and Bob have more communication channels, the communication rate will be even larger. Indeed, the rate approaches one as the number of channels increases.

In many practical heterogeneous networks, one may not assume that the cryptosystem, with the public-key, can be applied on all paths. The HUNCC coding scheme can ensure post-quantum security across the entire network, using the public-key only for the information transmitted over one path. Moreover, we discuss below important applications in which HUNCC may be used. Specifically, in addition to multipath communication, we also discuss single path communication, distributed storage, ultra-reliable low-latency streaming communications, and the case of myopic adversaries.

Figure 6:
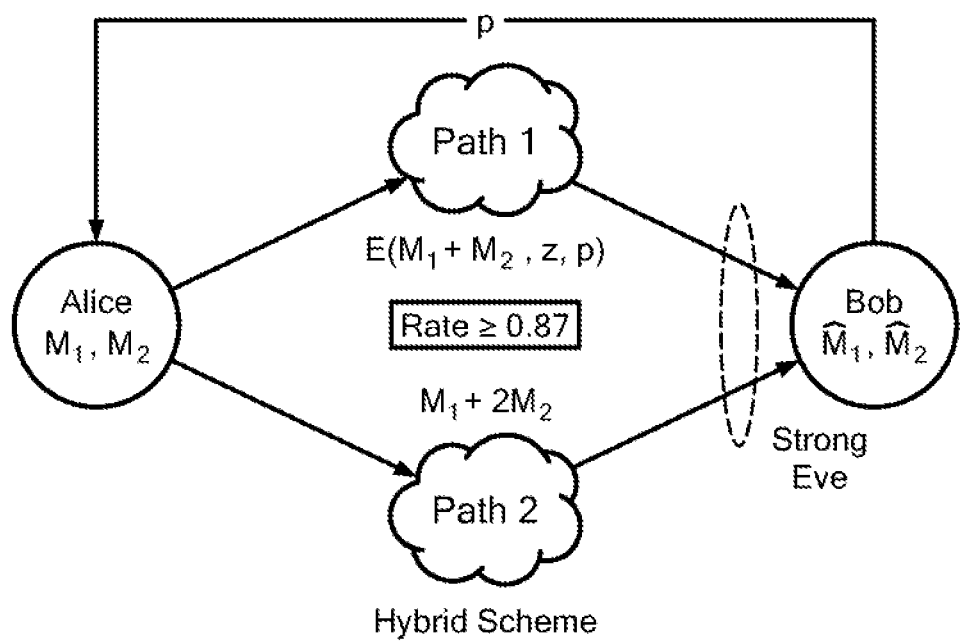
FIG. 6 shows a multipath network for communication between Alice and Bob that uses a hybrid universal network-coding cryptosystem (HUNCC) according to embodiments of the concepts, techniques, and structures disclosed herein, that is computationally secure against a strong Eve and informationally secure against a weak Eve.

For a network with two paths, we illustrate our hybrid scheme in FIG. 6: Alice wants to send a private message $$M = [M_1, M_2] \in \mathbb{F}_{q^u}^2$$

to Bob via l=2 communication links. An eavesdropper, Eve, depending on how strong she is, can observe the communication in one or both of these channels. In the example network of FIG. 6, we assume that Eve is strong and can observe both channels.

Alice and Bob agree on a public key encryption scheme (Enc,Dec,p,s). Alice first encodes the message M using the individually secure code with a generator matrix, for example $$G = \begin{pmatrix} 1 & 1 \\ 2 & 1 \end{pmatrix}.$$

We denote this encoding by $X=MG=[M_1+M_2, M_1+2M_2]$. Alice then encrypts the first message as $Enc(X_1,p)$, sends it to Bob via channel 1, and sends $X_2$ unencrypted via channel 2. Bob then decrypts $X_1=Dec(Enc(X_1,p),s)$ to retrieve all of X, and multiplies by the inverse of the generator matrix to decode and retrieve the original message $M=XG^{-1}$.

If Eve is a weak eavesdropper, observing only one communication channel, the scheme is information-theoretically individually secure irrespective of her computational power. This occurs because each piece of the message, $M_L$, is independent from any single encoded $X_j$. If Eve is a strong eavesdropper, observing both communication channels, each message $M_i$ will be computationally secure with almost the same security level as the encryption scheme (Enc,Dec, p,s). Indeed, we have shown in Theorem 1 of Cohen, Alejandro et al., "Network Coding-Based Post-Quantum Cryptography", Sep. 3, 2020, https://arxiv.org/abs/2009.01931 (hereinafter "Cohen et al."), reproduced below, that if the best known attack on (Enc,Dec,p,s) needs $2^b$ operations to break it, then Eve needs at least $2^b-\epsilon/2^b$ operations to determine any message $M_i$, where E is the amount of operations needed to solve a 2×2 linear system.

We note that for the individually secure code G to work, $\mathbb{F}_{q^u}$ must have characteristic larger than 2. Also, the image of the individually secure code must be injectively mapped into the domain of the encryption function Enc. We consider the following example.

Suppose Alice and Bob agree on using a 128-bit McEliece cryptosystem for the encrypted link. To be secure against modern computational security assumptions, Bob may select a [2960,2288]-Goppa code with a public key of 1537536 bits. In this case, the domain of the encryption function is $\mathbb{F}_2^{2288}$. Alice and Bob must agree on an injective mapping from the image of the code G, given by $\mathbb{F}_{q^u}$ with characteristic larger than 2, to $\mathbb{F}_2^{2288}$. In this case, they could set $q^u=3^{1443}$ so that $\log_2(q^u) \approx 2287.1$ bits. Thus, Alice can map $X_1$ into a 2288 bit vector and encode it using the Goppa code into $E(X_1,p) \in \mathbb{F}_2^{2960}$. Alice will then send $\log_2|E(X_1,p)|=2960$ bits through link 1 and $\log_2|X_2|\approx 2287.1$ bits through link 2. Thus, the total communication cost will be around 5248 bits giving a communication rate slightly larger than 0.87, as indicated in FIG. 6. By Theorem 1 of Cohen et al., both messages, $M_1$ and $M_2$ are 128-bit secure. Below, we look at an example where Alice and Bob agree on using an RSA scheme, which is vulnerable to Shor's Algorithm but is in common use and has a lower penalty to information rate.

Before turning to the details of a reference implementation, we give some background information on the two main building blocks of our scheme: 1) computational secure cryptosystems and, 2) information-theoretic individual security. We note that, although we focus on the McEliece cryptosystem, any computationally secure cryptosystem can be used.

Definition 1 A public-key encryption is a tuple (Enc,Dec, $p,s,k_b,n_b$) where:

Enc: $\{0,1\}^{k_b} \times \mathcal{P} \to \{0,1\}^{n_b}$ is the encryption function, Dec: $\{0,1\}^{n_b} \times \mathcal{S} \to \{0,1\}^{k_b}$ is the decryption function, and $p \in \mathcal{P}$ and $s \in \mathcal{S}$ represent the public and private key respectively, and For every message $\overline{m} \in \{0,1\}^{k_b}$, a public key $p \in \mathcal{P}$, and the corresponding secret key $s \in \mathcal{S}$, $Dec(Enc(\overline{m},p),s)=\overline{m}$.

A public-key encryption $(Enc,Dec,p,s,k_b,n_b)$ has security level b if the best known algorithm to recover $\overline{m}$ with the knowledge of $Enc(\overline{m})$ and p alone needs to perform at least $2^b$ operations. Finally $(Enc,Dec,p,s,k_b,n_b)$ is said to have rate R if $R=k_b/n_b$.

The McEliece post-quantum public-key cryptosystem works as follows. Bob generates the public key $p=(G^{pub}=SGP,t)$, where $G^{pub} \in \mathbb{F}_q^{k_b \times n_b}$. Both Alice and Eve have access to it. The private key consists of $s=(S,D_{\mathcal{G}},P)$, where $D_{\mathcal{G}}$ is an efficient decoding algorithm for $\mathcal{G}$. To encrypt a message $m \in \mathbb{F}_q^{k_b}$, Alice randomly chooses a vector $z \in \mathbb{F}^{n_b}$ of weight t and encrypts it as $c=mG^{pub} \oplus z$. To decrypt the message, Bob first calculates $cP^{-1}=mSG \oplus zP^{-1}$, and then applies the decoding algorithm $D_{\mathcal{G}}$. Since $cP^{-1}$ has hamming distance t, it follows that, $mSG=D_G(cP^{-1})$. Then, since both G and S are invertible, Bob recovers $m=(mSG)G^{-1}S^{-1}$.

By contrast to computational security, individual security operates under the assumption that Eve is a weak eavesdropper $Y_{E_w}$, i.e. only has access to w communication paths. The privacy guarantee is that, while Bob is able to decode completely all the $k_u \in \mathbb{F}_{q^u}$ messages transmitted over the network of length $k_b \in \mathbb{F}_2$ bits each, Eve is ignorant with respect to each individual message. Thus, $$H(M_j|Y_{E_w})=H(M_j) \forall j \in \{1, \ldots, k_u\}.$$

We next describe how to construct an individual security code from an arbitrary linear code. Thus, let $\mathcal{C}$ be a linear code over $\mathbb{F}_{q^u}$, with $u \geq k_u$, of length $k_u$ and dimension w, and set $k_s=k_u-w$. Let $G_{IS}^{**} \in \mathbb{F}_{q^u}^{w \times k_u}$ be a generator matrix for $\mathcal{C}$ and $G_{IS}^* \in \mathbb{F}_{q^u}^{k_s \times k_u}$ a generator for the null space of $\mathcal{C}$. Finally, let $H_{IS} \in \mathbb{F}_{q^u}^{k_s \times k_u}$ and $G_{IS} \in \mathbb{F}_{q^u}^{w \times k_u}$ be the parity check matrix and the basis matrix for the code $\mathcal{C}$, respectively, i.e. such that, $H_{IS}G_{IS}^{*T}=I$ and $G_{IS}G_{IS}^{**}=I$ yet $G_{IS}G_{IS}^*=0$. Then, the individual security code is generated by $$\begin{bmatrix} G_{IS}^* \\ G_{IS}^{**} \end{bmatrix} \in \mathbb{F}_{q^u}^{k_u \times k_u}.$$

It is appreciated that other individual security codes may be used in embodiments of the concepts, techniques, and structures disclosed herein.

It is important to note that unlike in public-key cryptosystems, and in particular the McEliece cryptosystem, in physical-layer security schemes, the generation matrix and the code is public. Thus, we can assume that both Bob and Eve have access to all the matrices described above.

An individual security code may be used as follows. Alice encodes the message M∈

$$\mathbb{F}_{q^u}^{k_u \times 1} \text{ as } X^T = M^T \begin{bmatrix} G_{IS}^* \\ G_{IS}^{**} \end{bmatrix} \in \mathbb{F}_{q^u}^{1 \times k_u}.$$

Thus, $X^T$ is a linear network coding of $M^T$ according to the individual security code. To decode the message, Bob uses the parity check matrix $H_{IS}$ and the basis matrix $G_{IS}$ to compute $(M_1; \ldots; M_{k'}) = HISX$ and $(M_{k'+1}; \ldots; M_k) = G_{IS}X$. Since Eve only observes w symbols from the encrypted vector $X^T$, she is not able to decode and is completely ignorant with respect to any set k–w symbols of information transmitted over the network.

We next define the security notions and the threat models used in the rest of the disclosure. Throughout, we assume a ciphertext-only attack model, i.e., the adversary Eve only has access to $Y_{E_s}$ or $Y_{E_w}$. We first define the notion of computational security.

Definition 2 A cryptosystem with message M and ciphertext c(M) has security level b if the best known algorithm needs to perform at least $2^b$ operations to decode M from the observation of c(M) alone in expectation.

It should be noted that this definition of security level imposes implicitly a restriction on the size of the encoded message M, and on its distribution. Indeed, assuming a public-key cryptosystem, the adversary may always use a brute-force attack, by guessing potential message inputs until the correct one is found. Generally, it is assumed that the message M takes a value uniformly at random in a set $\{0,1\}^{k_b}$, and thus it follows that $k_b \geq b$. In fact, most cryptosystems require $k_b$ to be strictly larger than b. Throughout this disclosure, we opt to leave this relationship implicit, and rather focus on the security level b, selecting the appropriate $k_b$ based on this security level.

The computation security level of Definition 2 is relevant in the case of a single link, or equivalently a single message. When there are several messages being transmitted on each link, it is desirable to provide a security guarantee that applies to each message individually. For a weak Eve, this can be obtained via information-theoretic individual secrecy.

Definition 3 A cryptosystem with messages $M_1, \ldots, M_l$ is (l,w)-individually secure if for every $\omega \subset [l]$, with $|\omega|=w$, $H(M_s|Y_\omega) = H(M_s)$ where $Y_\omega = [M_i]_{i \in \omega}$.

For a strong Eve, which can observe the entirety of the sent messages, (l,w)-individual security is unobtainable. Instead, we describe a notion of individual computational security, which states that the decoding of any message on any of the paths would require $2^b$ operations.

Definition 4 (Individual Computational Secrecy) A cryptosystem with messages $M_1, \ldots, M_l$ and ciphertexts $c_i \triangleq c_i(M_1, \ldots, M_l)$, for $i=1, \ldots, l$ has security level b if the best known algorithm needs to perform at least $2^b$ operations to decode any $M_j$, $j=1, \ldots, l$ from the observations $c_1, \ldots, c_l$, in expectation.

Note that individual computational secrecy implies in the computational security of the cryptosystem with $M=[M_1, \ldots, M_l]$ and $c(M)=[c_1(M_1, \ldots, M_l), \ldots, c_l(M_1, \ldots, M_l)]$. It is therefore a strictly stronger notion of security.

Figure 1:
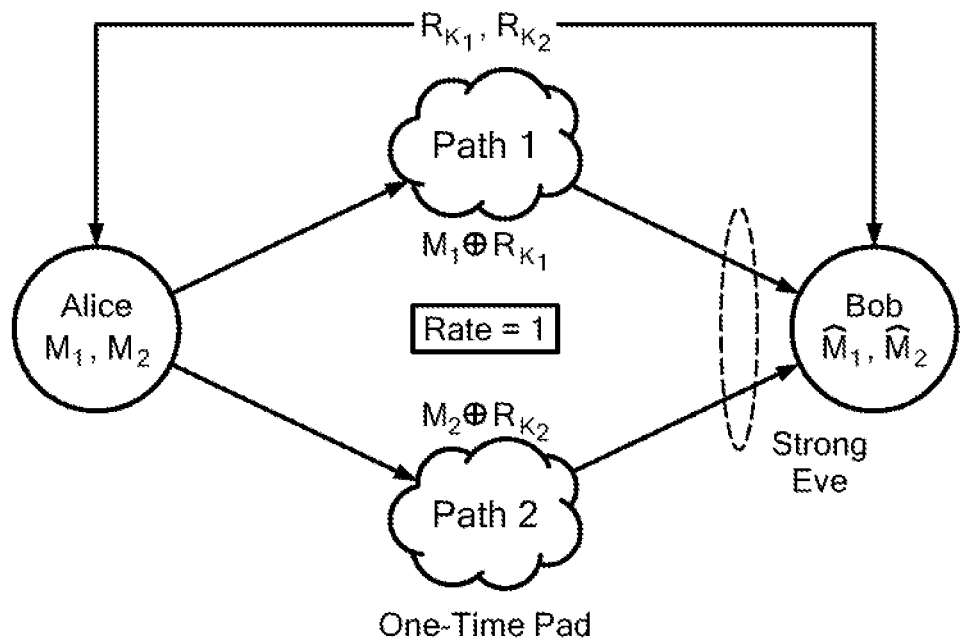
FIG. 1 shows a cryptosystem using a one-time pad for multipath communication between Alice and Bob that is secure against a "strong" eavesdropper Eve who can intercept all of the communicated data.
Figure 2:
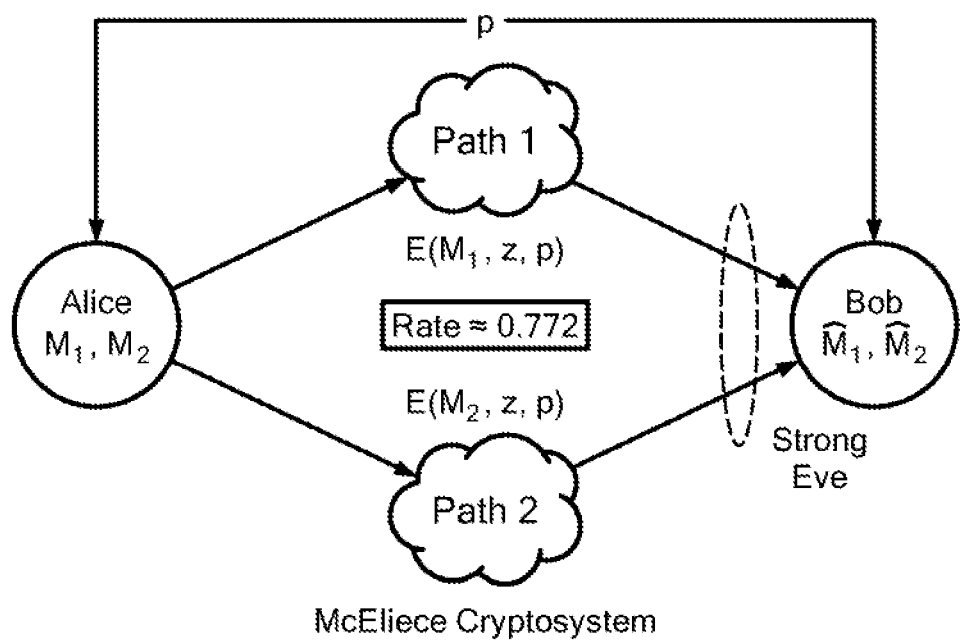
FIG. 2 shows a post-quantum McEliece cryptosystem using a [2960,2288]-Goppa code that is computationally secure against a strong Eve who has access to a quantum computer.
Figure 3:
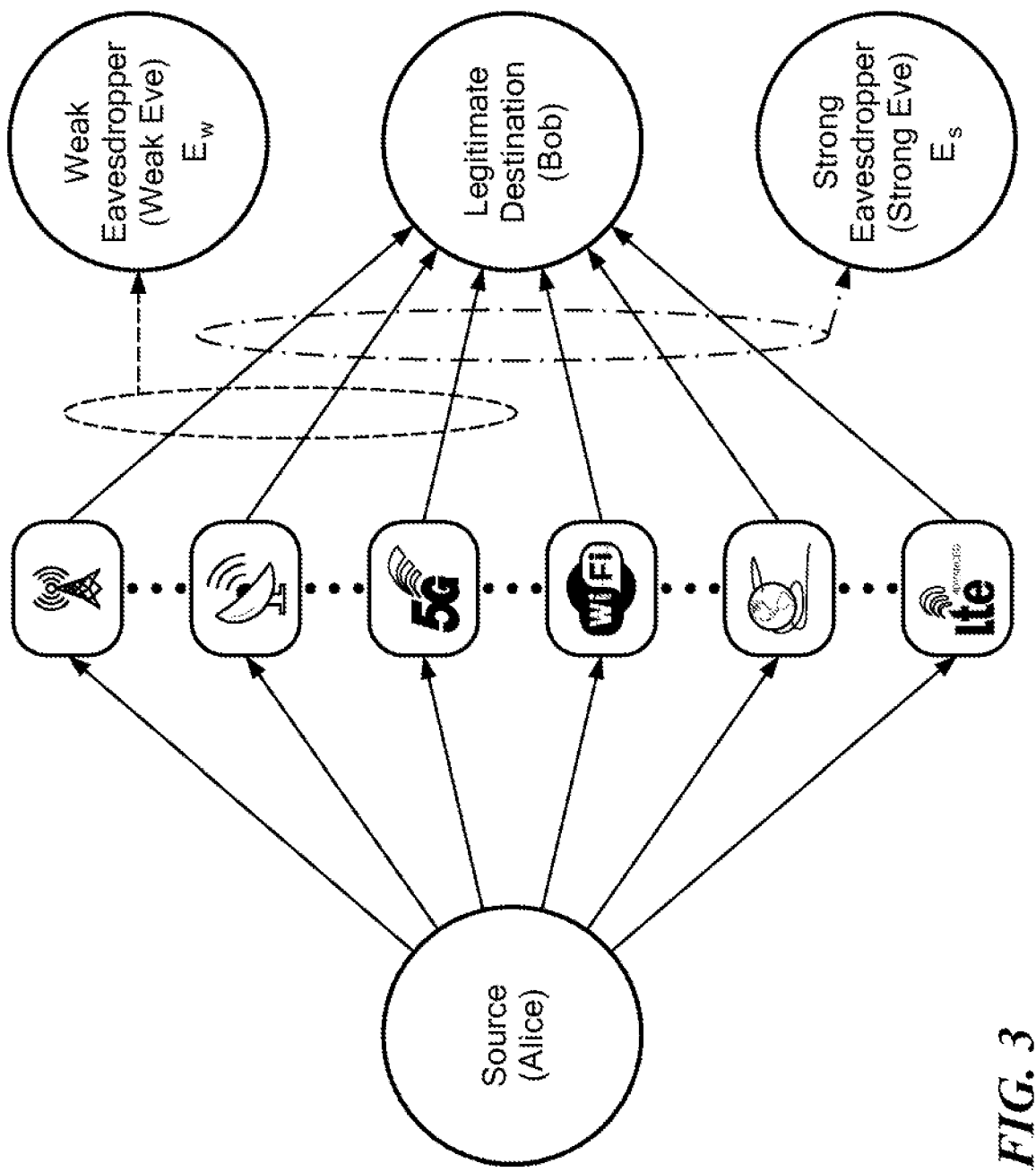
FIG. 3 shows a modern multipath network for communication between Alice and Bob that illustrates both a "strong" eavesdropper Eve who can intercept all of the communicated data and a "weak" Eve who can intercept only some of that data.
Figure 4:
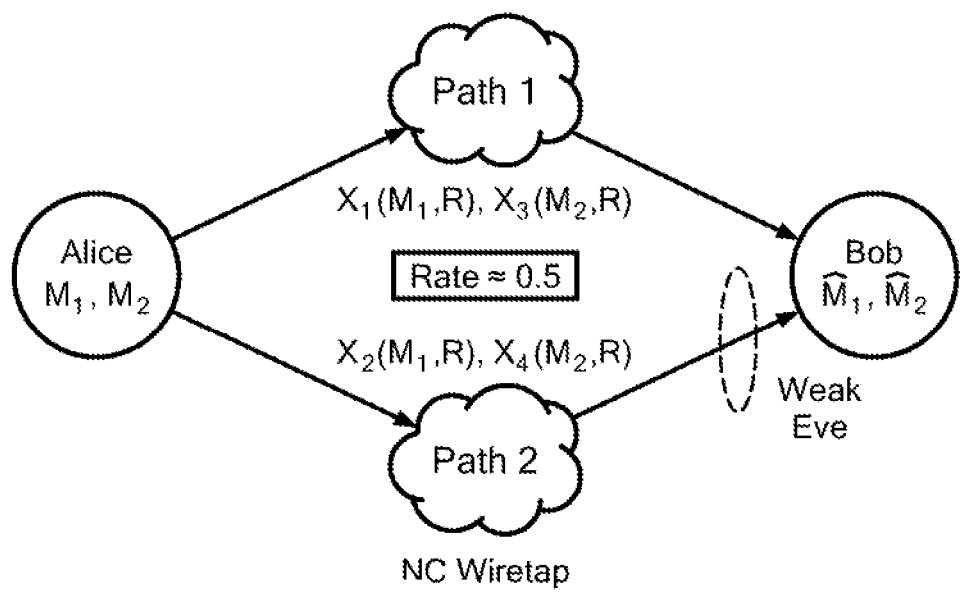
FIG. 4 shows a multipath network for communication between Alice and Bob that is informationally secure against a weak Eve having a network coding wiretap.
Figure 5:
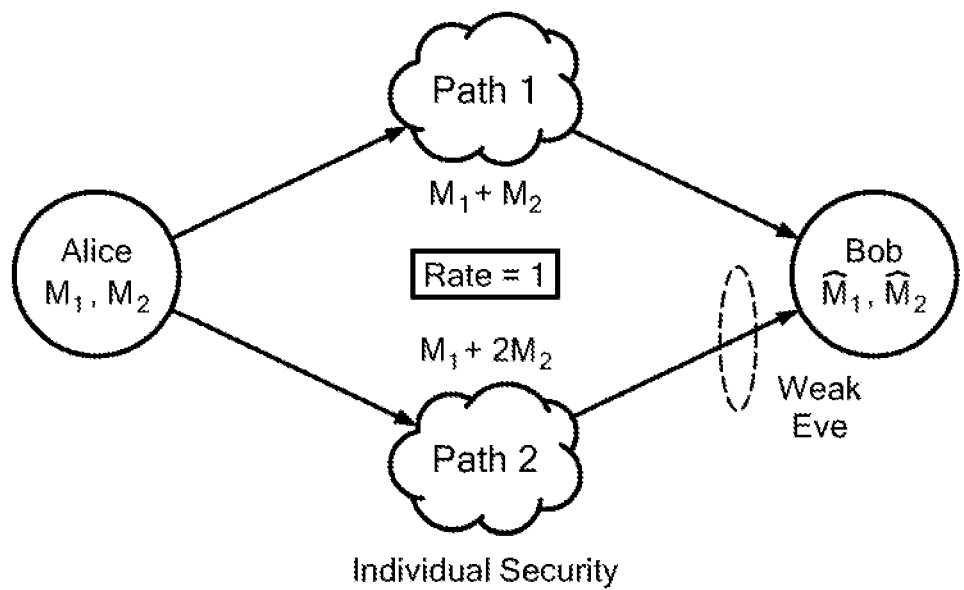
FIG. 5 shows a multipath network for communication between Alice and Bob that is informationally secure against a weak Eve using the principles of individual security for networks.
Figure 7:
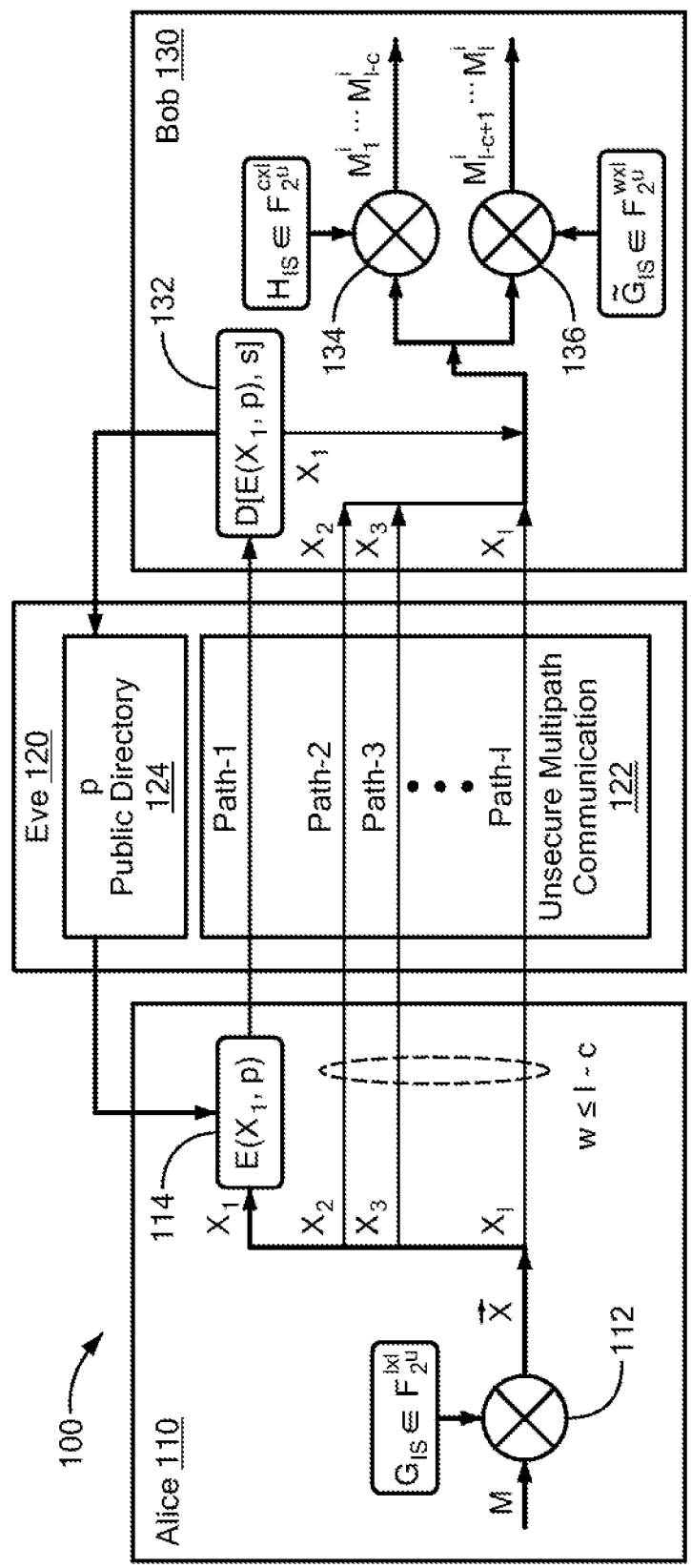
FIG. 7 shows functional components of the hybrid, post-quantum, secure, multipath network scheme of FIG. 6.

With reference now to FIG. 7, we consider a system overview of an embodiment in a network 100 consisting of a source node, Alice 110, connected to a destination node, Bob 130, via l noiseless independent communication links 122. The goal is for Alice 110 to transmit $k_u$ messages $M=[M_1; \ldots; M_{k_u}] \in \mathbb{F}_{q^{k_u}}^{k_u}$, of length $k_b \in \mathbb{F}_2$ bits each, privately to Bob 130 in the presence of an eavesdropper, Eve 120. We assume Eve 120 has access to a quantum computer. In what follows, the communication links 122 each may be different transmission media (several are shown in FIG. 3, for example), and are sometimes referred to herein as "data channels" or "paths". However, it is appreciated that embodiments of the concepts, techniques, and structures herein may be used with multiple data channels that exist within a single path (i.e. as different utilization times of a single transmission medium) as discussed below in connection with FIG. 12.

We denote by $Y=[Y_1; \ldots; Y_l]$ the vector of messages which Alice 110 sends to Bob via each communication link 122. These messages must be such that Bob 130 is able to decode M from them. Thus, we say Y is reliable if $H(M|Y)=0$. The messages Y, however, should satisfy certain properties if Eve 120 is not to decode M herself. This will depend on how powerful Eve 120 is.

We consider two types of Eve 120. A strong Eve 120, $E_s$, observes all communication links, having access to the entirety of Y. And a weak Eve 120, $E_w$, only observes a subset of the communication links 122. We denote the observations of each by $Y_{E_s}$ and $Y_{E_w}$, respectively. We note that because of reliability, information-theoretic privacy is not obtainable against a strong Eve 120.

At a high level, the cryptosystem works as follows. Alice 110 and Bob 130 agree on a public-key cryptosystem (Enc,Dec,p,s,$k_b$,$n_b$) as in Definition 1, with public key p stored in a public directory 124 that is accessible to Eve 120. Alice 110 then selects c of the l links 122 to be encrypted links. In FIG. 7, only a single message $X_1$ is shown as encrypted via an encryption processor 114, and thus c=1, but it is appreciated that any number of links may be selected for encryption. This alone does not provide full security, as the l–c links which do not experience encryption are unsecured. To solve this problem, we introduce an extra step before the encryption 114 in which the messages are mixed (encoded) by a matrix multiplier 112 using an individually secure linear code, especially a linear network code. By doing this, we have shown in Theorem 1 of Cohen et al. that each message is now computationally secure. The security performance and the total communication rate of the scheme will depend on the choice of c and of the parameters of the public-key cryptosystem. Bob 130 receives $Y=[Y_1; \ldots; Y_l]$ from the l communication links 122, decrypts the first c encrypted messages using a decryption processor 132, then decodes the first c messages using matrix multiplier 134 and decodes the last l–c messages using matrix multiplier 136, via the inverse of the mixing process 112 to recover the full initial message M.

Figure 9:
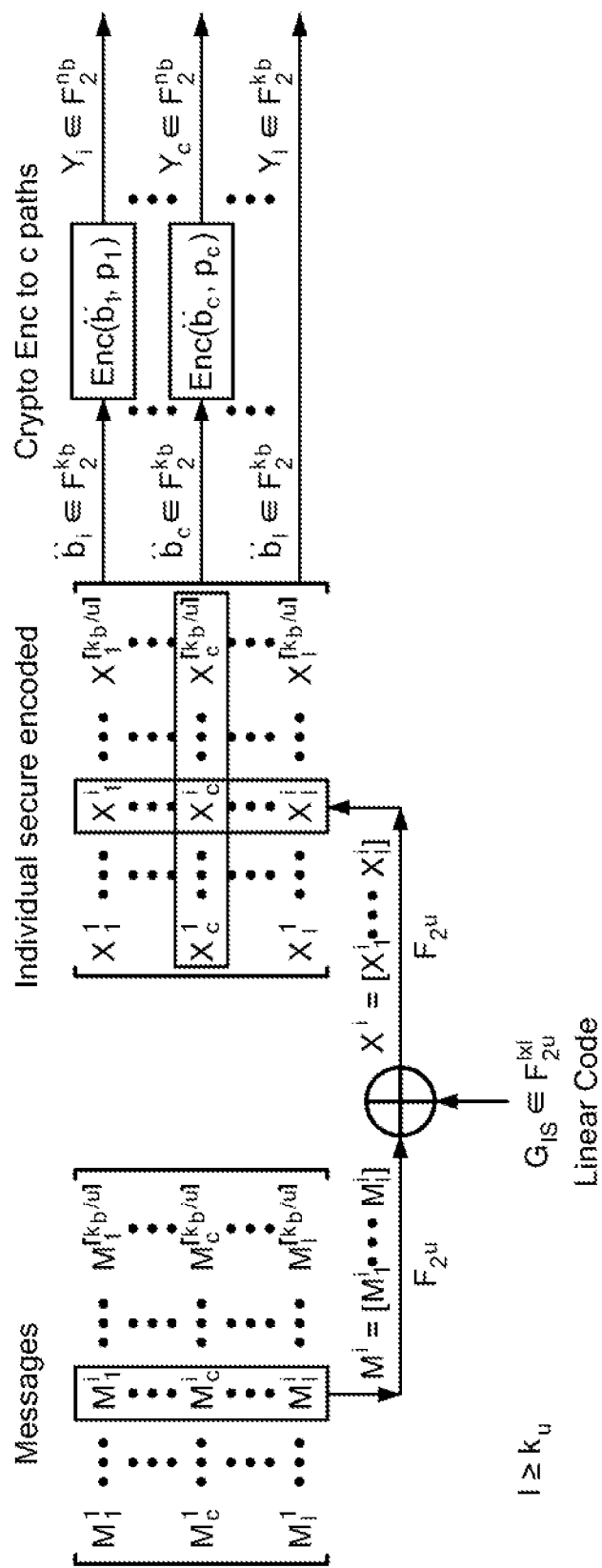
FIG. 9 shows details of the encoding scheme performed by Alice according to a HUNCC embodiment.

We now give a more detailed explanation of HUNCC, with reference again to the system shown in FIG. 7, as well as the overall Algorithm 1 shown in FIG. 8, and the encoding process performed by Alice 110 as shown in FIG. 9. Let (Enc,Dec,p,s,$k_b$,$n_b$) be a public-key cryptosystem, as described in Definition 1, with security level b. As usual, the public key p is generated by Bob 130 and provided to Alice 110 over some public communication channel (e.g. public directory 124). Alice 110 chooses a number c of paths 122 to be encrypted. Without loss of generality, we let the paths indexed by $1, \ldots, c$ to be the encrypted ones. Let u≥1 be fixed, and consider a plurality of data blocks having messages $M^{(1)}, \ldots, M^{(\lceil k_b/u \rceil)}$, where each $M^{(i)} = [M_1^{(i)}, \ldots, M_l^{(i)}]$ with $M_j^{(i)} \in \mathbb{F}_{2^u}$ is generated independently, and uniformly at random. Let $G_{IS}^{**} \in \mathbb{F}_{2^u}^{w \times l}$ be an (l,w)-individually secure linear code, where $w \leq l-c$. Select a generator matrix $G_{IS}^* \in \mathbb{F}_{2^u}^{c \times l}$ for the null space of the code. Note that since $u \geq 1$ and $l-w \geq 1$, such a code exists. The individual secrecy encoding matrix is then given by $$G_{IS} = \begin{bmatrix} G_{IS}^\star \\ G_{IS}^{\star\star} \end{bmatrix},$$

as described above. Thus, the vectors $X^{(1)}, \ldots, X^{(\lceil k_b/u \rceil)}$, where $X(i)=M(i)G_{IS}$ correspond to an (l,w)-individual secrecy encoding of $M^{(i)}$ (c.f. matrix multiplier 112 in FIG. 7, lines 1-5 in FIG. 8, and the left side of FIG. 9).

Now, for every path $i \in [c]$, consider the collection of symbols $X_i^{(1)}, \ldots, X_i^{(\lceil k_b/u \rceil)}$. Since $\mathbb{F}_{2^u} \simeq \mathbb{F}_2^u$, the collection $X_i^{(1)}, \ldots, X_i^{(\lceil k_b/u \rceil)}$ can be injectively mapped into a sequence of bits $\tilde{b}_i$ of length $k_b$. Each such $\tilde{b}_i$ is encrypted via the public-key encryption (e.g. using encryption processor 114) before being sent, i.e., each link i transmits $y_i=\text{Enc}(\tilde{b}_i, p_i)$. Note that $y_i$ is of length n. For the paths i>c, Alice 110 directly sends to Bob 130 the collection $X_i^{(1)}, \ldots, X_i^{(\lceil k_b/u \rceil)}$ unencrypted. For consistency, we assume that the data sent on the path is a bit sequence $\tilde{b}_i$, this time of length $k_b$ (c.f. lines 6-16 in FIG. 8, and the right side of FIG. 9).

We now detail the decoding process at Bob 130. We assume that all paths are error-free. Hence, Bob 130 obtains all the messages transmitted over communication links 122. For each of the c encrypted data channels, Bob 130 receives a message that comprises an encryption of an unencrypted first encoding of the data blocks, and uses the private key s to decode the message (c.f. decryption processor 132 in FIG. 7 and lines 17-20 in FIG. 8).

Thus, Bob 130 obtains $[X_i^{(1)}, \ldots, X_i^{(\lceil k_b/u \rceil)}]=\text{Dec}(y_i,s_i)$ for every $i \in [c]$. The messages obtained via the remaining l-c data channels were unencrypted encodings of the original data blocks. Thus, together with the decrypted messages from the first c paths, Bob 130 has the entirety of $X^{(1)}, \ldots, X^{(\lceil k_b/u \rceil)}$. Now, for each i-th column in the estimated encoded block, Bob 130 uses the parity check $H_{IS} \in \mathbb{F}_{2^u}^{c \times l}$ and the basis matrix $G_{IS} \in \mathbb{F}_{2^u}^{w \times l}$ to recover each message in the plurality of original messages transmitted (c.f. matrix multipliers 134, 136 in FIG. 6 and lines 21-25 in FIG. 8), i.e. $(M_1^i; \ldots; M_{l-c}^i)=H_{IS}X^i$ and $(M_{l-c+1}; \ldots; M_l^i)=G_{IS}X^i$.

Some advantages of using the above-described HUNCC system and method are now described. HUNCC is well suited for dealing with a strong Eve which observes the entirety of the communication links. In addition to being computationally secure, if Eve is a weak eavesdropper, observing no more than w of the paths, HUNCC is information-theoretically secure. And the information rate R approaches 1 with convergence rate $\mathcal{O}(1/l)$. These observations flow from the following three theorems, which we proved in Cohen et al.

Theorem 1. Let $u \geq 1$, $c \geq 1$, and $(\text{Enc},\text{Dec},p,s,k_b,n_b)$ be a public-key cryptosystem with security level b. Then, the algorithm of FIG. 8 with input $M=[M_1; \ldots; M_l] \in \mathbb{F}_{q^u}^{k_u}$ is individually computationally secure with level at least $b-\delta/2^b$, where $\delta$ is the number of operations needed to solve an $l \times l$ linear system of equations, i.e. $\delta = \mathcal{O}(l^3)$.

Theorem 2. The algorithm of FIG. 8 is (l,w)-individually secure.

Theorem 3. Let $1 \leq c \leq l$ be the number of encrypted paths using the public-key cryptosystem $(\text{Enc},\text{Dec},p_i,s_i,k_b,n_b)$. Then, the algorithm of FIG. 8 has information rate $$R = \frac{lk_b}{n_b c + k_b(l-c)}.$$

A few important remarks on HUNCC are in order. First, it is essential to note that the public key used in the c encrypted paths of HUNCC is just the traditional public key from the underlying cryptosystem (for instance, the one provided in the McEliece cryptosystem). Hence, this public key is independent of the $k_u$-messages transmitted over the multipath network and can be supplied to Alice in advance over a public channel.

Moreover, unlike in information-theoretic security where a unique secret key is utilized per message transmitted, as is the case for a one-time pad, the public key in HUNCC can be used for multiple messages. In the same manner, the generation matrix $G_{IS}$ of the individually secure code is not confidential. Alice and Bob can agree on it over a public channel, i.e. this matrix may be revealed to Eve. Also, this matrix may be used indefinitely for any future transmissions.

Another point is related to the security level of HUNCC. As stated in Theorem 1, if the underlying public-key cryptosystem has security level b, HUNCC is individually computationally secure with security level at least $b-\delta/2^b$ where $\delta = \mathcal{O}(l^3)$. We note that this value is extremely close to b. Indeed, if b=128 and we used Gaussian elimination to solve the relevant linear systems, HUNCC would need $l > 10^{38}$ to reduce the security level by even 1 bit.

Finally, although our main focus is on post-quantum cryptosystems, HUNCC can be used with any public-key cryptosystem, including ones which are combined with a symmetric-key cryptosystem.

Figure 10:
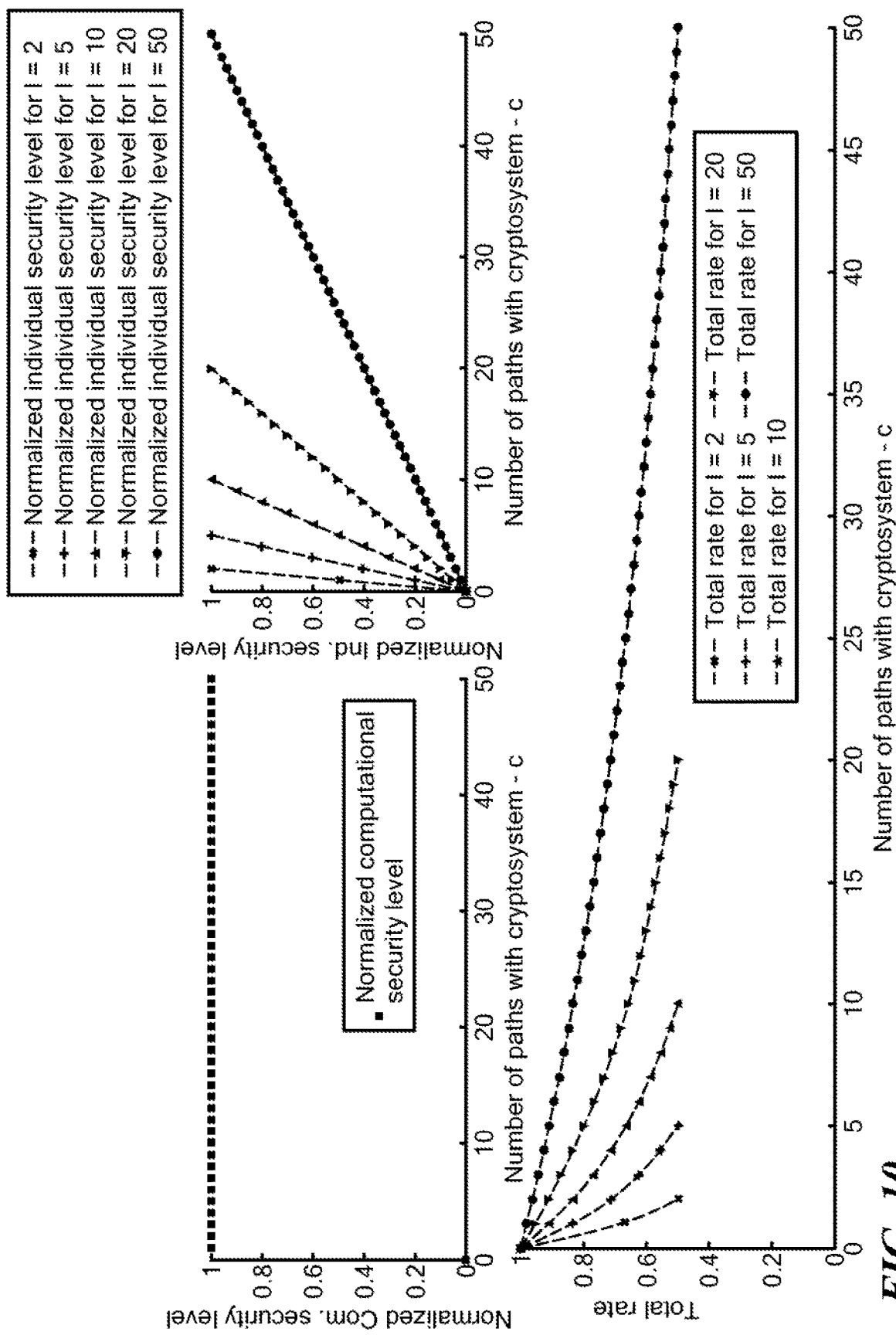
FIG. 10 shows efficiency and trade-off between security level and communication rate in a HUNCC embodiment as a function of the number of encrypted links using a McEliece code having information rate of about 0.5 for each encrypted link.
Figure 11:
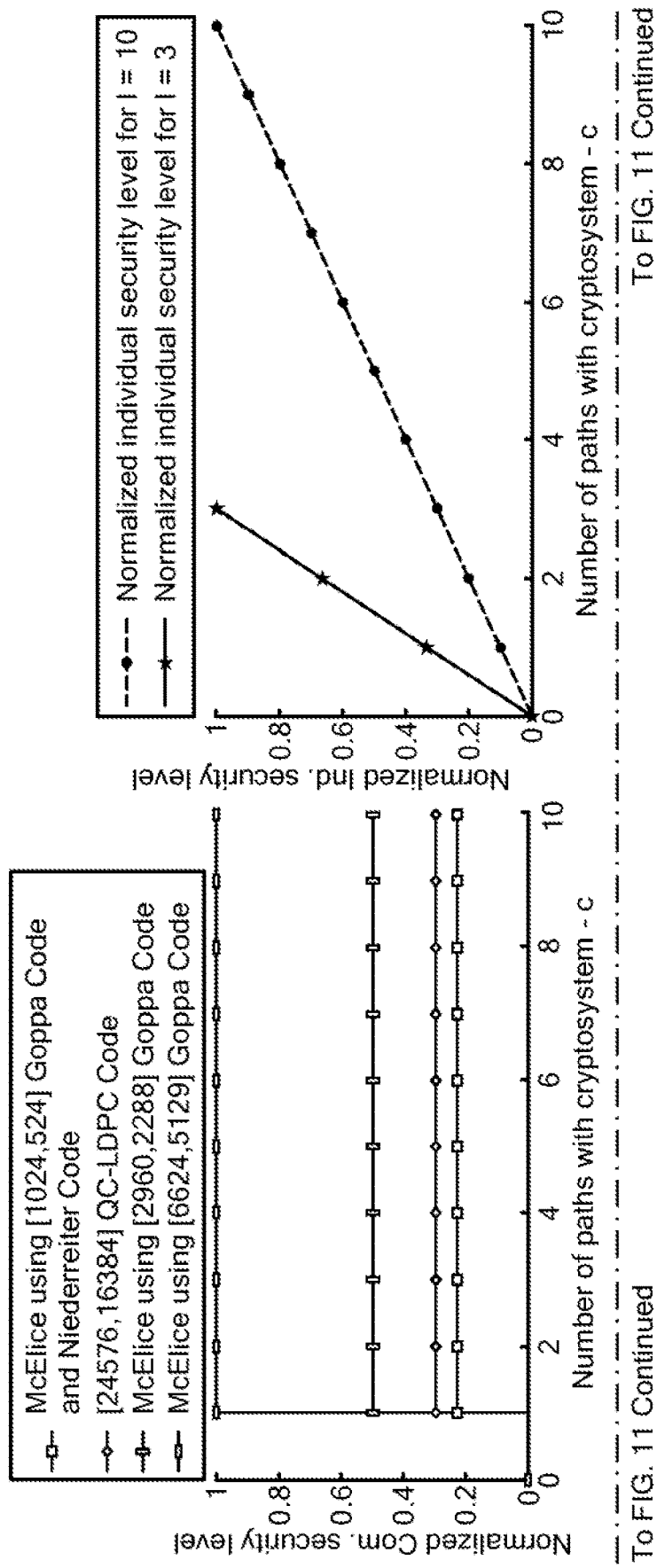
FIG. 11 shows efficiency and trade-off between security level and communication rate in a HUNCC embodiment as a function of the number of encrypted links using different computational security codes for each encrypted link.

In FIGS. 10 and 11 is shown the performance of HUNCC. Three measures are indicated: the information rate, the individual computational secrecy, and the information-theoretic individual secrecy. In particular, the trade-off between these quantities may be seen as the number of encrypted links, denoted by c in FIGS. 7-9, varies.

We start by considering the communication rate, see Theorem 3 above. We note that the rate increases as we reduce the number of encrypted links c. On the other hand, the computational security level remains virtually constant as long as at least one path is encrypted, i.e. $c \geq 1$. Therefore, practical systems embodying the concepts, techniques, and structures disclosed herein may use only a single encrypted path, link, or data channel, or may apply to only some portion of the data transmitted over these.

In the case of a weak Eve, the individual security level increases linearly with the number of links, l-w, from which the weak Eve does not get information. In other words, while the computational bit-level security remains constant, the uncertainty of an adversary which observes a subset of the links increases.

Thus, in FIG. 10 we illustrate each performance parameter versus the number of encrypted links c, for HUNCC with the original McEliece cryptosystem using a [1024, 512]-Goppa code. The information rate over each encrypted path is $k_b/n_b \approx 0.5$. For illustration purposes, we consider normalized measures of security, namely: 1) the normalized computational security level $$f_{crypto}^s = \frac{\min\{c,1\} \cdot b_{code}}{b_{max}},$$

which is the security level divided by the maximum computational security that can be obtained by using the cryptosystem over all links; and 2) the normalized individual security level $$f_{IS}^s = \frac{l-w}{l},$$

which is the fraction between the number of the links the weak Eve can see divided by the total links in the network.

In the example given in FIG. 10, the results are for the case in which the same McEliece cryptosystem code with the same public key is used in all of the c encrypted links. Hence, the normalized computational security level is zero if c=0 and one if c=l. Note that, via Theorem 1, the computational security level for any $1 \le c < l$, is bounded by $b - \delta/2^\delta$, where $\delta = O(l^3)$. This difference is negligible and does not appear on the plot, which essentially remains constant and equal to one for c≥1.

Embodiments disclosed herein are not restricted to the original McEliece cryptosystem. Any cryptosystem can be utilized. To illustrate this, in FIG. 11 is shown the efficiency of disclosed embodiments and the resulting trade-offs for other codes and systems for l=3 and l=10 communication links. First, we show a McEliece cryptosystem with the original parameters, namely [1024,524]-Goppa code which achieves b=58-bit computational security. Next, we show a McEliece cryptosystem with [2960,2288]-Goppa code which achieves b=128-bit computational security, and [6624,5129]-Goppa code for b=256-bit computational security. Both have an information rate of $k_b/n_b \approx 0.777$. Also, we show a McEliece cryptosystem adopting QC-LDPC codes. For this family of codes, the following parameters are suggested: $k_b=16384$ and $n_b=24576$, i.e. a code with rate $k_b/n_b=0.6667$. This code achieves b=75.8-bit computational security. Next, we show a Reed-Solomon code with a rate of 0.57 proposed by Niederreiter (noting that generalized Reed-Solomon codes have been broken in the literature). The Niederreiter-type system, which uses the same Goppa codes used by original McEliece construction, and with the same security level, was tested under the state-of-the-art attacks of the McEliece cryptosystem, and it is thus assumed to achieve b=58-bit computational security.

In this comparison, presented in FIG. 11, the maximum computational security level obtained is of 256-bit using the McEliece cryptosystem with [6624,5129]-Goppa codes. Hence, the results presented on the left in FIG. 11 for each possible code are normalized with $b_{max}=256$. Recall that while the computational security level is one of the main parameters considered in choosing a cryptosystem, another one is the size of the public-key. We note also that the computational security level of HUNCC remains essentially constant despite increasing the number of links that use the cryptosystem, for the reasons described above, or by changing the total number of paths in the network.

We next discuss features and applications that exemplify the utility and the performance of the disclosed HUNCC scheme. These applications include single path communication (FIG. 12), myopic adversaries (FIG. 13), distributed storage and other cloud applications, reliable low-latency communication (FIG. 14), and the use of the RSA cryptosystem rather than post-quantum or other cryptosystems.

Figure 12:
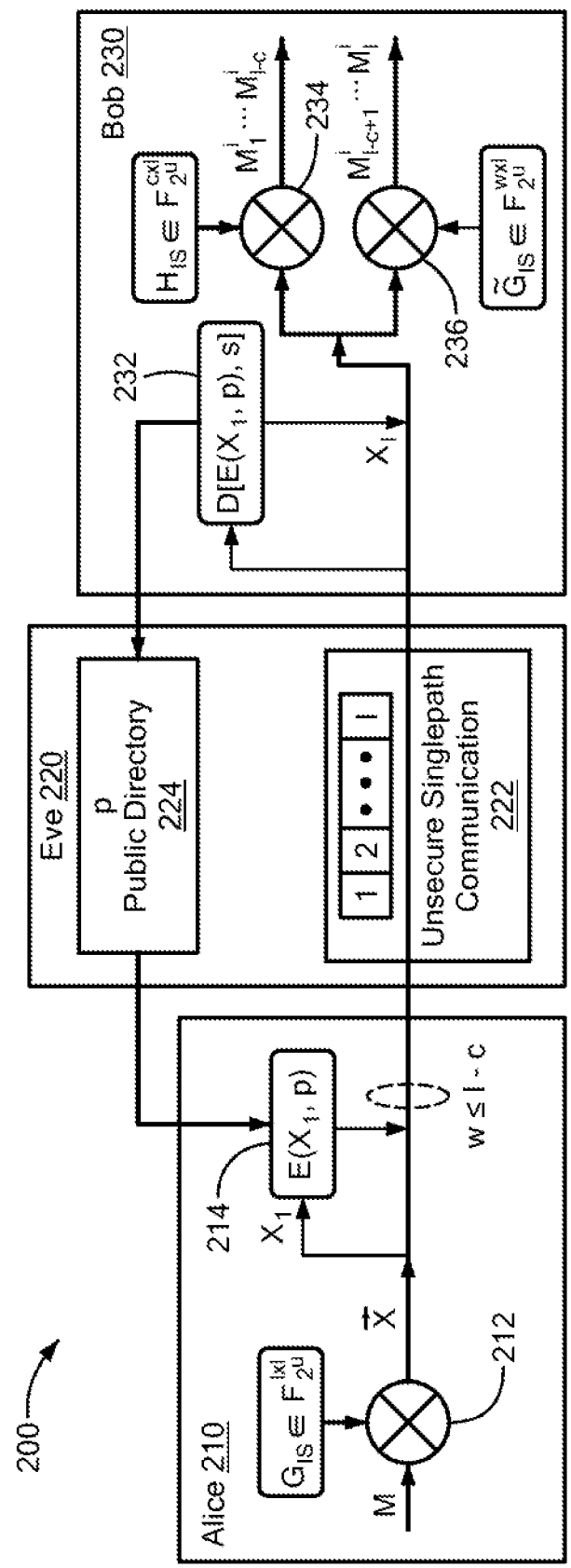
FIG. 12 shows functional components of a hybrid, post-quantum, secure, single path communication scheme according to an embodiment.

While the network shown in FIG. 7 uses multipath communication, the secure coding scheme we disclose herein is universal, in the sense that it can be applied to any communication network. For instance, it can be used in classical point-to-point single-path communication, as well as heterogeneous mesh networks. FIG. 12 depicts how the disclosed secure scheme can be applied in classical point-to-point single-path communication. In this setting 200, similar to the network 100 presented above, there is one source Alice 210, one legitimate destination Bob 230, and an eavesdropper Eve 220. The main difference is that, in setting 200, there is only one path 222 to transmit information between Alice 210 and Bob 230. Alice 210 wants to transmit securely over the single path 222 a message M of $k_u$ symbols over a finite field $\mathbb{F}_{q^u}$. For this, Alice 210 and Bob 230 may still utilize HUNCC as described above, by essentially simulating parallel virtual links (e.g. by time division multiplexing or other technique known in the art). More precisely, at the first stage Alice 210 will encode the $k_u$ symbols via a matrix multiplier 212 using the linear individual secure code, $G_{IS} \in \mathbb{F}_q^{l \times l}$. Then, Alice 210 encrypts c of the symbols before the transmission over the channel 222 using the public key provided by Bob in the public directory 224. The remaining process is as given above. Hence, we obtain the same communication rate and security level as in the multipath network case, but with only a single path or link.

Figure 13:
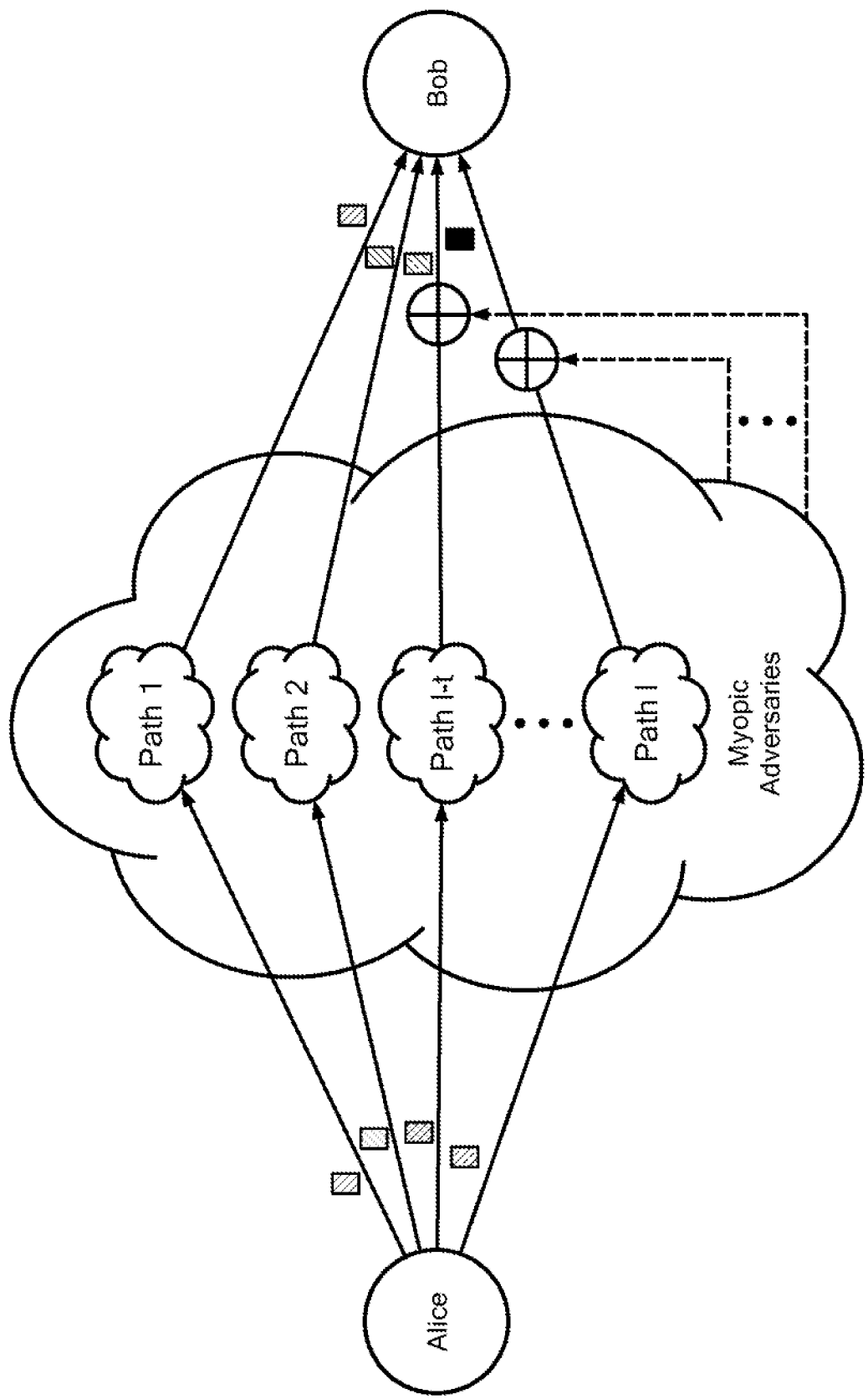
FIG. 13 shows a myopic adversaries model according to an embodiment in which eavesdroppers are able to inject errors into packets sent from Alice to Bob.

Another important scenario considered in the literature is one in which Eve is allowed not only to eavesdrop the information transmitted over the network, but also to corrupt the encrypted packets. This scenario is considered in the literature under different models of adversaries, for instance, with passive attacks, myopic adversaries, man in the middle attacks, byzantine attacks, and so on. A general depiction of packet corruption is illustrated in FIG. 13, in which myopic adversaries corrupt data flowing through up to t of the paths.

In the case of a weak eavesdropper, which can obtain only information from w<l subset of the paths in the network, we can augment our linear individual security code to perform correction of up to t errors which may be injected by Eve. One solution is to generalize the code, although such extension comes at a cost. To correct t injected errors, the rate must be decreased by 2t. Note, however, that in this setting the code can support the case in which Eve can corrupt any subset of messages transmitted over the network, whether they are on the paths which are encrypted, or not. Indeed, the correction property only relies on the decoding of the linear coding scheme, and is independent of the deciphering phase.

In the case of a strong eavesdropper, which can obtain the information from all the paths in the network, we can utilize the same generalized code to correct the t errors that may be injected by Eve. However, in this case, to ensure security, Alice will need to encrypt at least 2t+1 messages that are transmitted over the different paths in the network. Hence, we must encrypt the additional 2t messages, transmitted to correct the errors, to prevent Eve from obtaining sufficient encoded messages by the linear code, which may provide her with a matrix having the rank needed to decode the total message.

Authentication can be utilized between the encoded messages to reduce the overhead required to correct the injected errors in the above-disclosed solution. Note that if Bob is able to identify the corrupted messages, Alice needs to include only one additional symbol per injected error, as opposed to the two messages in the model presented above. Furthermore, the generalized linear code mentioned above supports the scenario where the paths in the network are not error-free. In the case where the cryptosystem is based on error-correction codes as in the McEliece cryptosystem, instead of adding an error vector at the source, Alice can use the errors of the channel to confuse Eve. The codes in those cases are designed to be able to decode at the legitimate decoder, given those errors. Hence Bob will be able to decode the information. All of those extensions allow us to increase the effective rate of those solutions.

HUNCC also may be applied to distributed storage and other "cloud" applications. The goal of a distributed storage system is to provide reliable access to data which is spread over unreliable storage nodes. Applications involving data centers are ubiquitous today, including Google's GFS and BigTable, Amazon's Dynamo, Facebook's Apache Hadoop, Microsoft's WAS, and LinkedIn's Voldemort and SkyFlok.

One of the main drawbacks of distributed storage is that, the risk in the security and privacy of the data is potentially increased as the data are stored at increasing numbers of locations. One way to address this problem is by reinterpreting the problem as a multipath network. This is done by considering Alice and Bob to be the same individual at different times, and the communication links to be the storage nodes. In this way, the different privacy solutions to the multipath network, including HUNCC, can be readily applied to secure the data in a distributed storage system. Erasures and errors, of both a probabilistic or adversarial nature, can be addressed using techniques to correct errors introduced by myopic adversaries, described above, with similar results.

Figure 14:
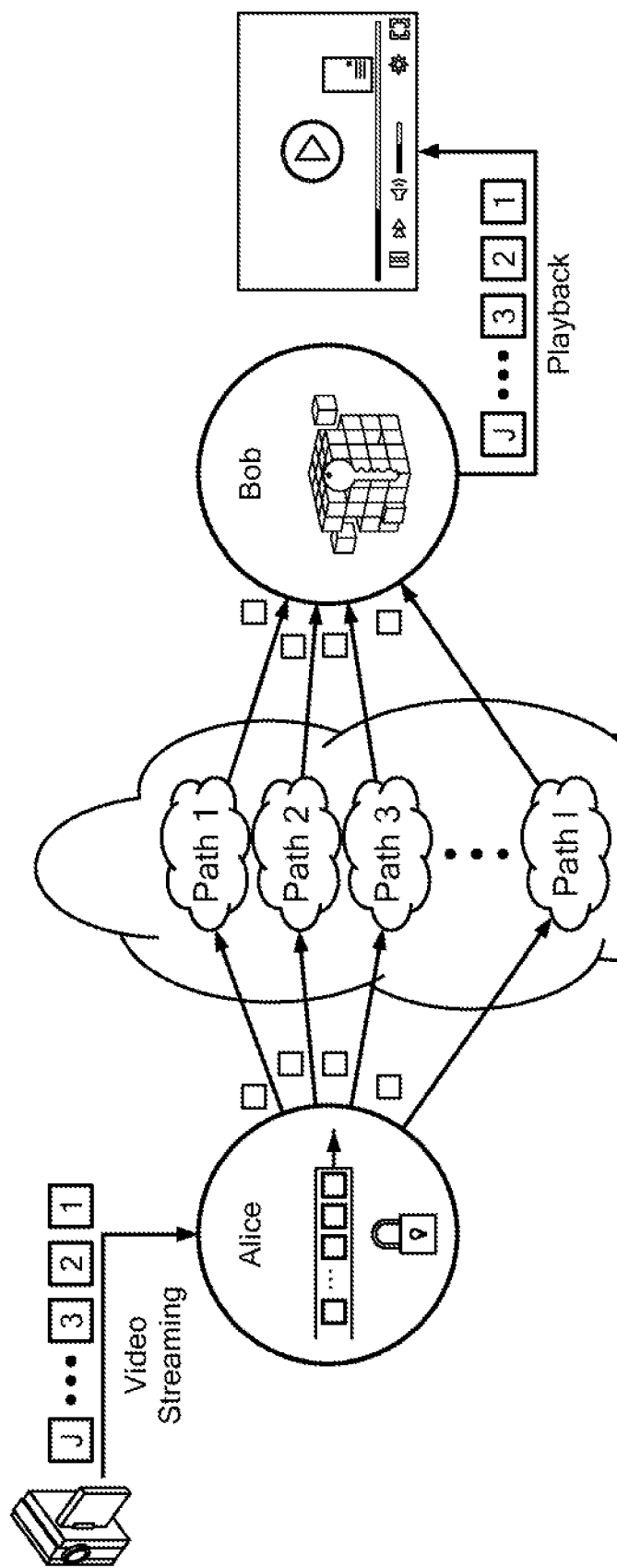
FIG. 14 shows an ultra-reliable, low-latency communications system for video streaming according to an embodiment.

HUNCC also may be used to provide ultra-reliable, low-latency communications, Recently the application of network coding in streaming communication which demand low delays has been considered, with applications in audio/video streaming, smart-city communications, Internet-of-Things (IoT) networks and control applications, distributed computation, and so on. In this connection, FIG. 14 depicts a multipath, low-latency communication environment for video streaming, where Alice produces or receives digital video packets and streams them to Bob. Traditional coding solutions which achieve high throughput are generally not suitable to guarantee low, in-order delivery delay which is a requirement in these applications. This has led to a series of work that propose methods to explore the trade-off between high-rate, and low-delay.

However, when the communication needs to also be secure, HUNCC may be used in conjunction with various network coding schemes known in the art. In those coding schemes, the number of messages from Alice, that are involved in the linear network encoding process, depend on the desired rate/delay trade-off. But in the security application using HUNCC, this number is further constrained by the security guarantees that are desired. This might come at the cost of delay, as more messages may need to be mixed in together to provide secrecy.

Finally, regarding HUNCC applications, we note that any computationally secure cryptosystem can be used in accordance with an embodiment of the concepts, techniques, and structures disclosed herein. In particular, RSA can be applied in our network-coding solution, in the context of the example given in FIG. 6, i.e. a multipath network with two paths. As a first stage of encoding at Alice, we assume that the generation matrix, $$G = \begin{pmatrix} 1 & 1 \\ 2 & 1 \end{pmatrix},$$

of the individual security code is used such that $X=MG=[M_1+M_2, M_1+2M_2]$. Now, say Alice and Bob agree on using an RSA scheme only over the first path. For 128-bit security, they settle on using a 3072 bit key. Using a 328 bit OAEP padding, the message size can be at most 2744 bits. Thus, Alice can map $X_1$ into a 2744 bit vector and encode it using RSA into $E(X_1, p) \in \mathbb{F}_2^{3072}$. Alice will then send $\log_2 |E(X_1, p)| = 3072$ bits through channel 1 and $\log_2 |X_2| \leq 2288$ bits through channel 2. Thus, the total communication cost will be around 5360 bits giving a communication rate slightly greater than 0.85.

Figure 15:
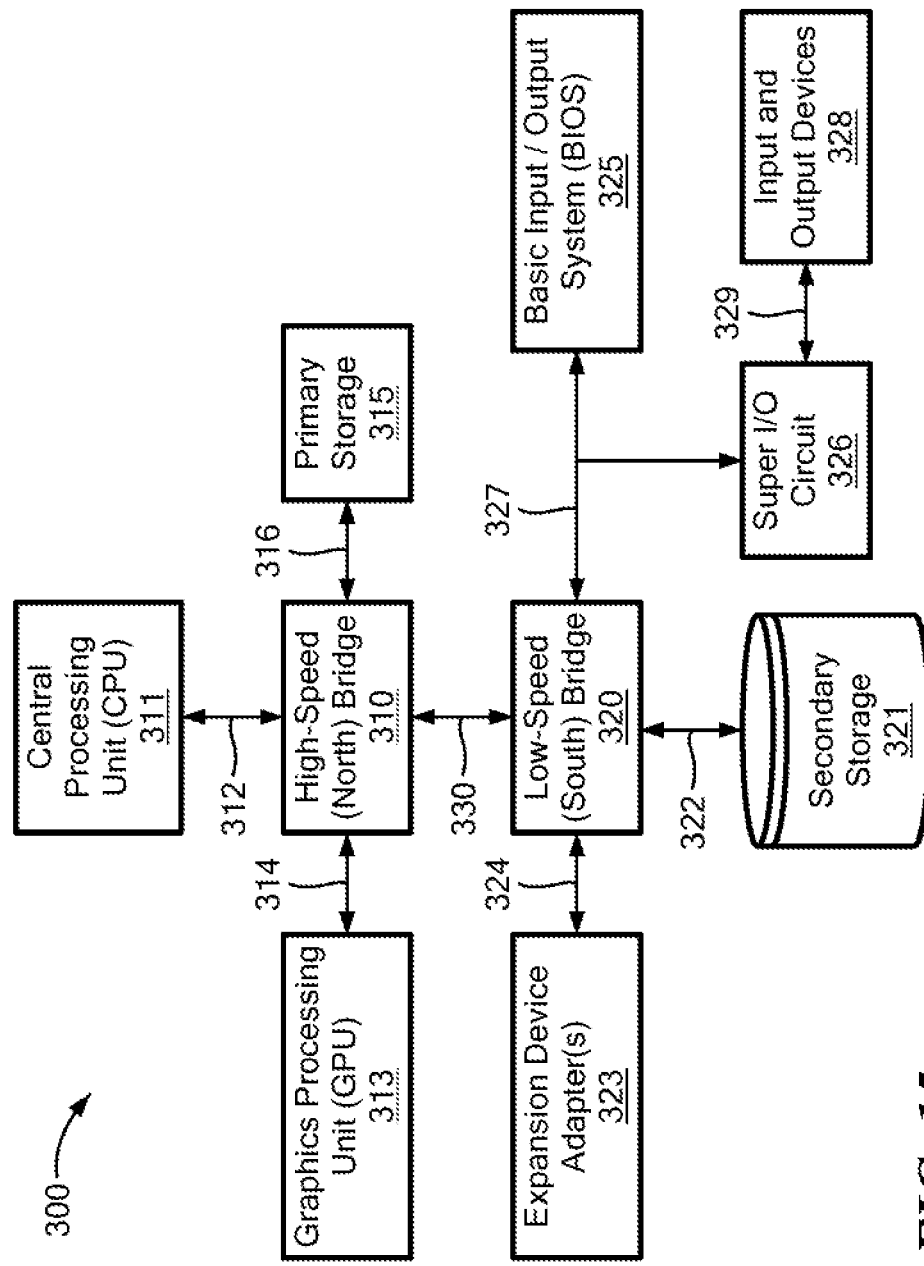
FIG. 15 schematically shows relevant physical components of a computer that may be used to embody the concepts, structures, and techniques disclosed herein.

FIG. 15 schematically shows relevant physical components of a computer 300 that may be used to embody the concepts, structures, and techniques disclosed herein. In particular, the computer 300 may be used, in whole or in part: to implement the environment 100 shown in FIG. 7 or any part thereof, especially Alice's node 110 or Bob's node 130 or the communication pathways 122 or the public directory 124; or Algorithm 1 shown in FIG. 8 or any part thereof, or the matrix operations and cryptographic operations shown in FIG. 9; or the environment 200 shown in FIG. 12 or any part thereof, especially Alice's node 210 or Bob's node 230 or the single communication path 222 or the public director 224; or the video streaming and playback functions shown in FIG. 14. Generally, the computer 300 has many functional components that communicate data with each other using data buses. The functional components of FIG. 3 are physically arranged based on the speed at which each must operate, and the technology used to communicate data using buses at the necessary speeds to permit such operation.

Thus, the computer 300 is arranged as high-speed components and buses 311 to 316 and low-speed components and buses 321 to 329. The high-speed components and buses 311 to 316 are coupled for data communication using a high-speed bridge 310, also called a "northbridge," while the low-speed components and buses 321 to 329 are coupled using a low-speed bridge 320, also called a "southbridge."

The computer 300 includes a central processing unit ("CPU") 311 coupled to the high-speed bridge 310 via a bus 312. The CPU 311 is electronic circuitry that carries out the instructions of a computer program. As is known in the art, the CPU 311 may be implemented as a microprocessor; that is, as an integrated circuit ("IC"; also called a "chip" or "microchip"). In some embodiments, the CPU 311 may be implemented as a microcontroller for embedded applications, or according to other embodiments known in the art.

The bus 312 may be implemented using any technology known in the art for interconnection of CPUs (or more particularly, of microprocessors). For example, the bus 312 may be implemented using the HyperTransport architecture developed initially by AMD, the Intel QuickPath Interconnect ("QPI"), or a similar technology. In some embodiments, the functions of the high-speed bridge 310 may be implemented in whole or in part by the CPU 311, obviating the need for the bus 312.

The computer 300 includes one or more graphics processing units (GPUs) 313 coupled to the high-speed bridge 310 via a graphics bus 314. Each GPU 313 is designed to process commands from the CPU 311 into image data for display on a display screen (not shown). In some embodiments, the CPU 311 performs graphics processing directly, obviating the need for a separate GPU 313 and graphics bus 314. In other embodiments, a GPU 313 is physically embodied as an integrated circuit separate from the CPU 311 and may be physically detachable from the computer 300 if embodied on an expansion card, such as a video card. The GPU 313 may store image data (or other data, if the GPU 313 is used as an auxiliary computing processor) in a graphics buffer.

The graphics bus 314 may be implemented using any technology known in the art for data communication between a CPU and a GPU. For example, the graphics bus 314 may be implemented using the Peripheral Component Interconnect Express ("PCI Express" or "PCIe") standard, or a similar technology.

The computer 300 includes a primary storage 315 coupled to the high-speed bridge 310 via a memory bus 316. The primary storage 315, which may be called "main memory" or simply "memory" herein, includes computer program instructions, data, or both, for use by the CPU 311. The primary storage 315 may include random-access memory ("RAM"). RAM is "volatile" if its data are lost when power is removed, and "non-volatile" if its data are retained without applied power. Typically, volatile RAM is used when the computer 300 is "awake" and executing a program, and when the computer 300 is temporarily "asleep", while non-volatile RAM ("NVRAM") is used when the computer 300 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 316 may be implemented using any technology known in the art for data communication between a CPU and a primary storage. The memory bus 316 may comprise an address bus for electrically indicating a storage address, and a data bus for transmitting program instructions and data to, and receiving them from, the primary storage 315. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 300 may use up to $8*2^{32}=32$ gigabytes (GB) of primary storage 315. In this example, the memory bus 316 will have a total width of 64+32=96 bits. The computer 300 also may include a memory controller circuit (not shown) that converts electrical signals received from the memory bus 316 to electrical signals expected by physical pins in the primary storage 315, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 311, the graphics processing units 313, the primary storage 315, and the high-speed bridge 310, or any combination thereof, as a single integrated circuit. In such embodiments, buses 312, 314, 316 may form part of the same integrated circuit and need not be physically separate. Other designs for the computer 300 may embody the functions of the CPU 311, graphics processing units 313, and the primary storage 315 in different configurations, obviating the need for one or more of the buses 312, 314, 316.

The depiction of the high-speed bridge 310 coupled to the CPU 311, GPU 313, and primary storage 315 is merely exemplary, as other components may be coupled for communication with the high-speed bridge 310. For example, a network interface controller ("NIC" or "network adapter") may be coupled to the high-speed bridge 310, for transmitting and receiving data using a data channel. The NIC may store data to be transmitted to, and received from, the data channel in a network data buffer.

The high-speed bridge 310 is coupled for data communication with the low-speed bridge 320 using an internal data bus 330. Control circuitry (not shown) may be required for transmitting and receiving data at different speeds. The internal data bus 330 may be implemented using the Intel Direct Media Interface ("DMI") or a similar technology.

The computer 300 includes a secondary storage 321 coupled to the low-speed bridge 320 via a storage bus 322. The secondary storage 321, which may be called "auxiliary memory", "auxiliary storage", or "external memory" herein, stores program instructions and data for access at relatively low speeds and over relatively long durations. Since such durations may include removal of power from the computer 300, the secondary storage 321 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 322 may be implemented using any technology known in the art for data communication between a CPU and a secondary storage and may include a host adaptor (not shown) for adapting electrical signals from the low-speed bridge 320 to a format expected by physical pins on the secondary storage 321, and vice versa. For example, the storage bus 322 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 300 also includes one or more expansion device adapters 323 coupled to the low-speed bridge 320 via a respective one or more expansion buses 324. Each expansion device adapter 323 permits the computer 300 to communicate with expansion devices (not shown) that provide additional functionality. Such additional functionality may be provided on a separate, removable expansion card, for example an additional graphics card, network card, host adaptor, or specialized processing card.

Each expansion bus 324 may be implemented using any technology known in the art for data communication between a CPU and an expansion device adapter. For example, the expansion bus 324 may transmit and receive electrical signals using a Peripheral Component Interconnect ("PCI") standard, a data networking standard such as an Ethernet standard, or a similar technology.

The computer 300 includes a basic input/output system ("BIOS") 325 and a Super I/O circuit 326 coupled to the low-speed bridge 320 via a bus 327. The BIOS 325 is a non-volatile memory used to initialize the hardware of the computer 300 during the power-on process. The Super I/O circuit 326 is an integrated circuit that combines input and output ("I/O") interfaces for low-speed input and output devices 328, such as a serial mouse and a keyboard. In some embodiments, BIOS functionality is incorporated in the Super I/O circuit 326 directly, obviating the need for a separate BIOS 325.

The bus 327 may be implemented using any technology known in the art for data communication between a CPU, a BIOS (if present), and a Super I/O circuit. For example, the bus 327 may be implemented using a Low Pin Count ("LPC") bus, an Industry Standard Architecture ("ISA") bus, or similar technology. The Super I/O circuit 326 is coupled to the I/O devices 328 via one or more buses 329. The buses 329 may be serial buses, parallel buses, other buses known in the art, or a combination of these, depending on the type of I/O devices 328 coupled to the computer 300.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

It will be further understood that various changes in the details, materials, and arrangements of the parts which have been described and illustrated in order to explain the nature of the claimed invention might be made by those skilled in the art without departing from the scope of the following claims.

What is claimed is:

1. A method of securely communicating a message to an individual, the method comprising:
receiving, using a first data channel, first data that comprise an encryption of a first portion of an encoding of the message using an individually secure code with a generator matrix;
receiving, using a second data channel, second data that comprise a second portion of the encoding of the message using the generator matrix, wherein the first data channel and the second data channel comprise different transmission media and wherein receiving the first message or receiving the second message comprises correcting one or more errors;
decrypting the first data to retrieve the first portion of the encoding of the message;
retrieving the message by multiplying the first portion of the encoding and the second portion of the encoding by the inverse of the generator matrix; and
displaying the message to the individual.

2. The method according to claim 1, wherein the first data channel and the second data channel comprise different utilization times of a single transmission medium.

3. The method according to claim 1, wherein the encryption comprises a public-key encryption.

4. The method according to claim 1, wherein the encryption comprises a post-quantum encryption.

5. The method according to claim 1, wherein recovering comprises decoding the decrypted first encoding and the second encoding according to the individually secure linear code.

6. The method according to claim 5, wherein the individually secure linear code comprises a linear network code.

7. An apparatus for securely communicating a message to an individual, the apparatus comprising:
- a computing processor; and
- a non-volatile memory storing computer program code that, when executed by the computing processor, performs the processes of:
    - receiving, using a first data channel, first data that comprise an encryption of a first portion of an encoding of the message using an individually secure code with a generator matrix;
    - receiving, using a second data channel, second data that comprise a second portion of the encoding of the message using the generator matrix, wherein the first data channel and the second data channel comprise different transmission media and wherein receiving the first message or receiving the second message comprises correcting one or more errors;
    - decrypting the first data to retrieve the first portion of the encoding of the message;
    - retrieving the message by multiplying the first portion of the encoding and the second portion of the encoding by the inverse of the generator matrix; and
    - displaying the message to the individual.

8. The apparatus according to claim 7, wherein the first data channel and the second data channel comprise different utilization times of a single transmission medium.

9. The apparatus according to claim 7, wherein the encryption comprises a public-key encryption.

10. The apparatus according to claim 7, wherein the encryption comprises a post-quantum encryption.

11. The apparatus according to claim 7, wherein recovering comprises decoding the decrypted first encoding and the second encoding according to the individually secure linear code.

12. The method according to claim 11, wherein the individually secure linear code comprises a linear network code.

13. The method according to claim 1, wherein the individually secure code uses a finite field having a characteristic larger than 2.

* * * * *

UNITED STATES PATENT AND TRADEMARK OFFICE
CERTIFICATE OF CORRECTION

PATENT NO. : 12,261,949 B2
APPLICATION NO. : 17/460991
DATED : March 25, 2025
INVENTOR(S) : Muriel Medard et al.

It is certified that error appears in the above-identified patent and that said Letters Patent is hereby corrected as shown below:

In the Claims

Column 20, Line 49, delete "message or receiving the second message" and replace with --data or receiving the second data--.

Column 20, Line 64, delete "recovering" and replace with --retrieving--.

Column 20, Line 65, delete "first encoding" and replace with --first portion of the encoding--.

Column 20, Line 66, delete "second encoding" and replace with --second portion of the encoding--.

Column 20, Line 66, delete "linear".

Column 21, Line 2, delete "secure linear code" and replace with --secure code--.

Column 21, Line 18, delete "message or receiving the second message" and replace with --data or receiving the second data--.

Column 22, Lines 12-13, delete "recovering" and replace with --retrieving--.

Column 22, Line 13, delete "first encoding" and replace with --first portion of the encoding--.

Column 22, Line 14, delete "second encoding" and replace with --second portion of the encoding--.

Column 22, Line 15, delete "linear".

Column 22, Line 16, delete "method" and replace with --apparatus--.

Column 22, Line 17, delete "secure linear code" and replace with --secure code--.

Signed and Sealed this
Second Day of September, 2025

Coke Morgan Stewart
*Acting Director of the United States Patent and Trademark Office*